United States Patent
Kawai

(10) Patent No.: US 11,722,797 B2
(45) Date of Patent: Aug. 8, 2023

(54) LEAKAGE LIGHT DETECTION DEVICE, IMAGING DEVICE, LEAKAGE LIGHT DETECTION METHOD, AND LEAKAGE LIGHT DETECTION PROGRAM

(71) Applicant: FUJIFILM Corporation, Tokyo (JP)

(72) Inventor: Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/509,165

(22) Filed: Oct. 25, 2021

(65) Prior Publication Data

US 2022/0046193 A1 Feb. 10, 2022

Related U.S. Application Data

(63) Continuation of application No. PCT/JP2020/017950, filed on Apr. 27, 2020.

(30) Foreign Application Priority Data

May 15, 2019 (JP) .................... 2019-092227

(51) Int. Cl.
*H04N 25/62* (2023.01)
*H04N 23/60* (2023.01)

(52) U.S. Cl.
CPC ........... *H04N 25/62* (2023.01); *H04N 23/60* (2023.01)

(58) Field of Classification Search
CPC .... H04N 5/359; H04N 5/232; H04N 9/04557; H04N 5/225; H04N 5/232122; H04N 5/23216; H04N 5/36961
See application file for complete search history.

(56) References Cited

U.S. PATENT DOCUMENTS

| | | | |
|---|---|---|---|
| 2013/0002902 A1* | 1/2013 | Ito | H04N 25/61 348/224.1 |
| 2014/0240550 A1 | 8/2014 | Taniguchi et al. | |

(Continued)

FOREIGN PATENT DOCUMENTS

| | | |
|---|---|---|
| JP | 2014-165522 A | 9/2014 |
| JP | 2014-194440 A | 10/2014 |

(Continued)

OTHER PUBLICATIONS

International Search Report issued in PCT/JP2020/017950; dated Jun. 23, 2020.

(Continued)

*Primary Examiner* — Sinh Tran
*Assistant Examiner* — Zhenzhen Wu
(74) *Attorney, Agent, or Firm* — Studebaker & Brackett PC

(57) ABSTRACT

Provided are a leakage light detection device, an imaging device, a leakage light detection method, and a non-transitory computer readable recording medium storing a leakage light detection program capable of improving quality of a captured image. A determination unit (11A) compares a pixel value (Gu3) of a pixel (G12) with a pixel value (Gb1) of a pixel (G14) and determines that the pixel (G12) has leakage light from a pixel (G11) in a case where the pixel value (Gu3) is larger than the pixel value (Gb1) by a threshold (TH) or more, and compares a pixel value (Gd3) of a pixel (G13) with the pixel value (Gb1) of the pixel (G14) and determines that the pixel (G13) has the leakage light from the pixel (G11) in a case where the pixel value (Gd3) is larger than the pixel value (Gb1) by the threshold (TH) or more.

38 Claims, 10 Drawing Sheets

(56) References Cited

U.S. PATENT DOCUMENTS

| | | | |
|---|---|---|---|
| 2015/0062386 A1* | 3/2015 | Sugawara | G02B 7/34 |
| | | | 348/241 |
| 2015/0326838 A1 | 11/2015 | Kawai et al. | |
| 2016/0191826 A1 | 6/2016 | Furuya | |
| 2018/0152651 A1* | 5/2018 | Matsunaga | H04N 5/3696 |
| 2018/0338096 A1* | 11/2018 | Matsunaga | H01L 27/146 |
| 2020/0029035 A1* | 1/2020 | Agranov | H04N 5/3572 |

FOREIGN PATENT DOCUMENTS

| | | |
|---|---|---|
| JP | 2016-127389 A | 7/2016 |
| JP | 2016-144090 A | 8/2016 |
| WO | 2014/136570 A1 | 9/2014 |

OTHER PUBLICATIONS

International Preliminary Report On Patentability issued in PCT/JP2020/017950; completed Oct. 1, 2020.

* cited by examiner

LEAKAGE LIGHT DETECTION DEVICE, IMAGING DEVICE, LEAKAGE LIGHT DETECTION METHOD, AND LEAKAGE LIGHT DETECTION PROGRAM

CROSS-REFERENCE TO RELATED APPLICATIONS

This application is a Continuation of PCT International Application No. PCT/JP2020/017950 filed on Apr. 27, 2020, which claims priority under 35 U.S.C. § 119(a) to Japanese Patent Application No. 2019-092227 filed on May 15, 2019. Each of the above application(s) is hereby expressly incorporated by reference, in its entirety, into the present application.

BACKGROUND OF THE INVENTION

1. Field of the Invention

The present invention relates to a leakage light detection device, an imaging device, a leakage light detection method, and a non-transitory computer readable recording medium storing a leakage light detection program.

2. Description of the Related Art

There is known an imaging element in which a part of pixels is configured as a pixel for focus detection and focus detection of a phase difference detection method is possible by using an output of the pixel for focus detection (refer to, for example, JP2016-127389A). An image processing device that determines whether or not a pixel value of a pixel for imaging adjacent to the pixel for focus detection is affected by flare and corrects the pixel value thereof in a case where the pixel value is determined to be affected by the flare is described in JP2016-127389A.

SUMMARY OF THE INVENTION

An object of the present invention is to provide a leakage light detection device, an imaging device, a leakage light detection method, and a non-transitory computer readable recording medium storing a leakage light detection program capable of improving quality of a captured image.

A leakage light detection device according to an aspect of the present invention comprises an imaging element having a light-receiving surface in which at least three types of pixels that detect different colors including a first color and a second color are arranged two-dimensionally along a first direction and a second direction orthogonal to the first direction, and a determination unit that determines presence or absence of leakage light to a pixel to be detected from a pixel other than the pixel to be detected using a pixel value acquired from the imaging element. The light-receiving surface includes a first pixel group that consists of a pixel group that detects the second color and includes a specific pixel, one or more pixels adjacent to the specific pixel in the first direction, and one or more pixels adjacent to the specific pixel in the second direction. The determination unit determines any pixel of the first pixel group excluding the specific pixel as the pixel to be detected, determines at least one pixel of the first pixel group excluding the specific pixel and the pixel to be detected as a pixel for determination, and determines the presence or absence of the leakage light of a direction toward the pixel to be detected from the specific pixel based on a first pixel value which is a pixel value of the pixel to be detected and a second pixel value which is a pixel value of the pixel for determination.

An imaging device according to an aspect of the present invention comprises the leakage light detection device and the imaging element.

A leakage light detection method of determining presence or absence of leakage light to a pixel to be detected from a pixel other than the pixel to be detected by using a pixel value acquired from an imaging element having a light-receiving surface in which at least three types of pixels that detect different colors including a first color and a second color are arranged two-dimensionally along a first direction and a second direction orthogonal to the first direction. The leakage light detection method comprises determining any pixel of a first pixel group arranged on the light-receiving surface, excluding a specific pixel, as the pixel to be detected, the first pixel group consisting of a pixel group that detects the second color and including the specific pixel, one or more pixels adjacent to the specific pixel in the first direction, and one or more pixels adjacent to the specific pixel in the second direction, determining at least one pixel of the first pixel group excluding the specific pixel and the pixel to be detected as a pixel for determination, and determines the presence or absence of the leakage light of a direction toward the pixel to be detected from the specific pixel based on a first pixel value of the pixel to be detected and a second pixel value of the pixel for determination.

A non-transitory computer readable recording medium storing a leakage light detection program for determining presence or absence of leakage light to a pixel to be detected from a pixel other than the pixel to be detected by using a pixel value acquired from an imaging element having a light-receiving surface in which at least three types of pixels that detect different colors including a first color and a second color are arranged two-dimensionally along a first direction and a second direction orthogonal to the first direction. The leakage light detection program causes a computer to execute a step of determining any pixel of a first pixel group arranged on the light-receiving surface, excluding a specific pixel, as the pixel to be detected, the first pixel group consisting of a pixel group that detects the second color and including the specific pixel, one or more pixels adjacent to the specific pixel in the first direction, and one or more pixels adjacent to the specific pixel in the second direction, a step of determining at least one pixel of the first pixel group excluding the specific pixel and the pixel to be detected as a pixel for determination, and a step of determining the presence or absence of the leakage light of a direction toward the pixel to be detected from the specific pixel based on a first pixel value of the pixel to be detected and a second pixel value of the pixel for determination.

According to an embodiment of the present invention, it is possible to provide a leakage light detection device, an imaging device, a leakage light detection method, and a non-transitory computer readable recording medium storing a leakage light detection program capable of improving the quality of the captured image.

DESCRIPTION OF THE PREFERRED EMBODIMENTS

Hereinafter, embodiments of the present invention will be described with reference to drawings.

Figure 1:
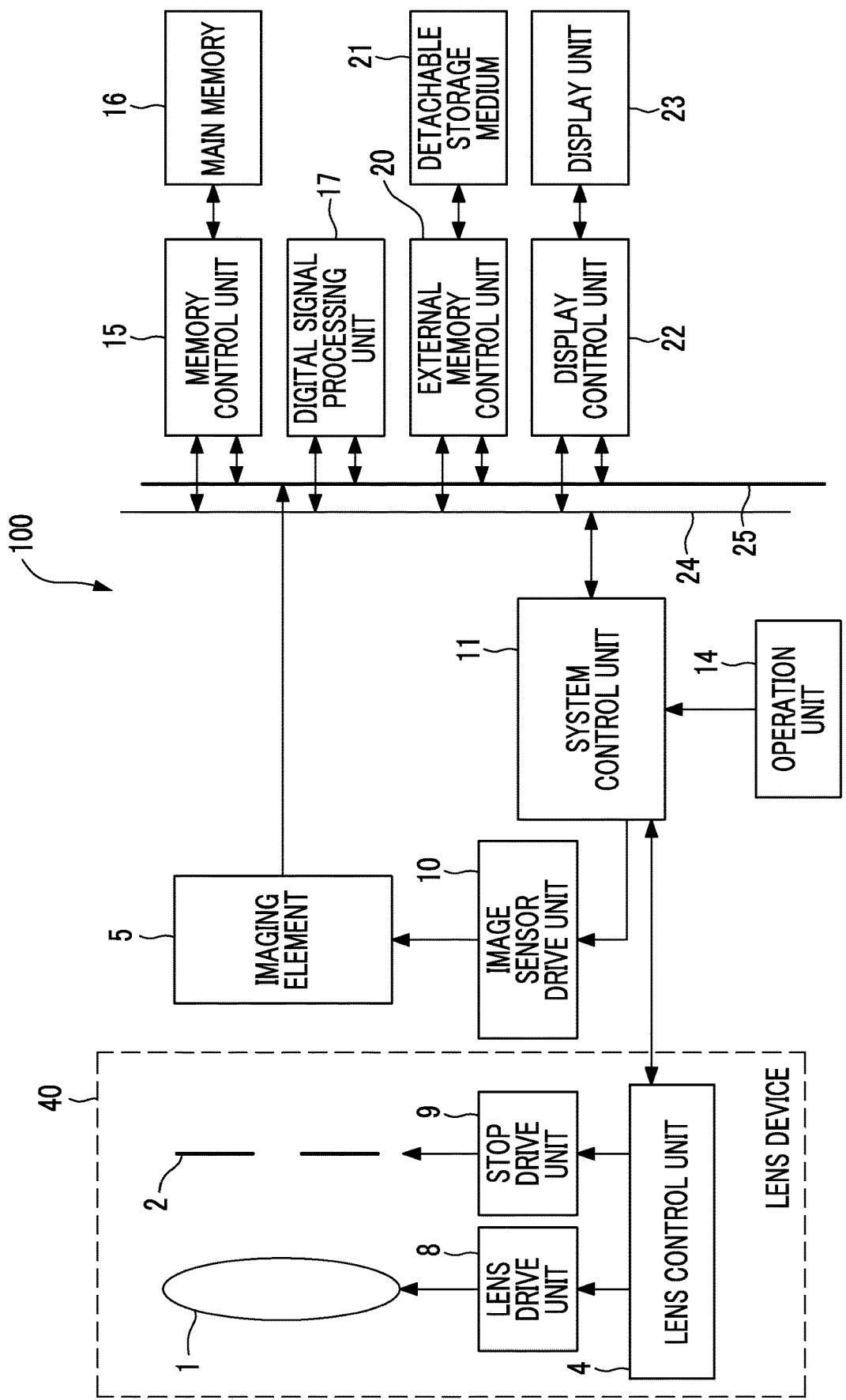
FIG. 1 is a diagram showing a schematic configuration of a digital camera 100 as an example of an imaging device for describing an embodiment of the present invention.

FIG. 1 is a diagram showing a schematic configuration of a digital camera 100 as an example of an imaging device for describing an embodiment of the present invention.

The digital camera shown in FIG. 1 comprises a lens device 40 having an imaging lens 1, a stop 2, a lens control unit 4, a lens drive unit 8, and a stop drive unit 9, and a main body unit. The lens device 40 may be attached to and detached from the main body unit of the digital camera 100 or may be fixed to the main body unit.

The imaging lens 1 and the stop 2 constitute an imaging optical system, and the imaging optical system includes at least a focus lens. This focus lens is a lens for adjusting focus of the imaging optical system and is composed of a single lens or a plurality of lenses. The focus lens moves in an optical axis direction of the imaging optical system to perform the focus adjustment. A liquid lens capable of changing a focal position by variably controlling a curved surface of the lens may be used as the focus lens.

The lens control unit 4 of the lens device 40 is configured to be able to communicate with a system control unit 11 of the main body unit of the digital camera 100 by wire or wirelessly.

The lens control unit 4 drives the focus lens included in the imaging lens 1 through the lens drive unit 8 or drives the stop 2 through the stop drive unit 9 according to an instruction from the system control unit 11.

The main body unit of the digital camera 100 comprises an imaging element 5 such as a charge coupled device (CCD) image sensor or a complementary metal oxide semiconductor (CMOS) image sensor that images a subject through the imaging optical system.

The system control unit 11 that integrally controls the entire electrical control system of the digital camera 100 drives the imaging element 5 through the imaging element drive unit 10 to capture a subject image through the lens device 40 and outputs the image as a captured image signal. A command signal from a user is input to the system control unit 11 through the operation unit 14.

The system control unit 11 integrally controls the entire digital camera 100 and includes various processors that execute programs to perform processing, a random access memory (RAM), and a read only memory (ROM).

The various processors include a central processing unit (CPU) which is a general-purpose processor that executes a program to perform various pieces of processing, a programmable logic device (PLD) whose circuit configuration is changeable after manufacturing such as a field programmable gate array (FPGA), or a dedicated electric circuit which is a processor having a circuit configuration exclusively designed to execute specific processing such as an application specific integrated circuit (ASIC).

More specifically, structures of these various processors are electric circuits in which circuit elements such as semiconductor elements are combined.

The system control unit 11 may be configured by one of the various processors or a combination of two or more processors of the same type or different types (for example, a combination of a plurality of FPGAs or a combination of a CPU and an FPGA).

The system control unit 11 executes a program including a leakage light detection program stored in a built-in ROM to realize each function described below.

Further, the main body unit of the digital camera 100 is provided with a main memory 16, a memory control unit 15 connected to the main memory 16, a digital signal processing unit 17 that performs an interpolation calculation, a gamma correction calculation, an RGB/YC conversion processing, and the like on the captured image signal output from the imaging element 5 to generate captured image data, an external memory control unit 20 to which a detachable storage medium 21 is connected, and a display control unit 22 to which a display unit 23, mounted on a back surface of the main body unit or the like, is connected.

The memory control unit 15, the digital signal processing unit 17, the external memory control unit 20, and the display control unit 22 are connected to each other by a control bus 24 and a data bus 25, and are controlled by the instruction from the system control unit 11.

Figure 2:
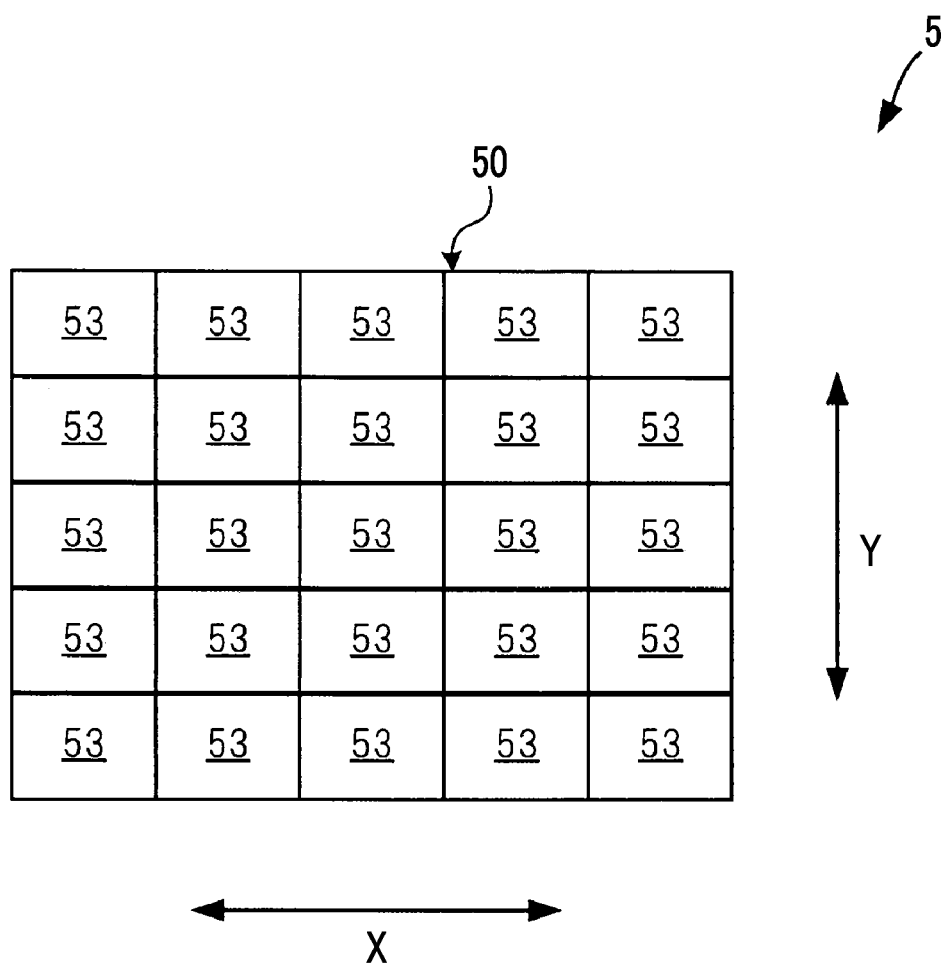
FIG. 2 is a schematic plan view of an overall configuration of an imaging element 5 mounted on the digital camera 100 shown in FIG. 1.

FIG. 2 is a schematic plan view of an overall configuration of the imaging element 5 mounted on the digital camera 100 shown in FIG. 1.

The imaging element 5 has a light-receiving surface 50 in which a large number of pixels arranged two-dimensionally in a row direction X (first direction) and a column direction Y (second direction) orthogonal to the row direction X are arranged. In the following, one side of the column direction Y (upper side in FIG. 2) is referred to as a top side or top, and the other side of the column direction Y (lower side in FIG. 2) is referred to as a bottom side or bottom. One side of the row direction X (right side in FIG. 2) is referred to as a right side or right, and the other side of the row direction X (left side in FIG. 2) is referred to as a left side or left.

The light-receiving surface 50 is provided with 25 focus detection areas (hereinafter referred to as AF areas) 53, which are areas to be focused, in the example of FIG. 2. The AF area 53 is an area in which a plurality of phase difference detection lines composed of a plurality of pixels for phase difference detection arranged in the row direction X are provided separately in the column direction Y.

Figure 3:
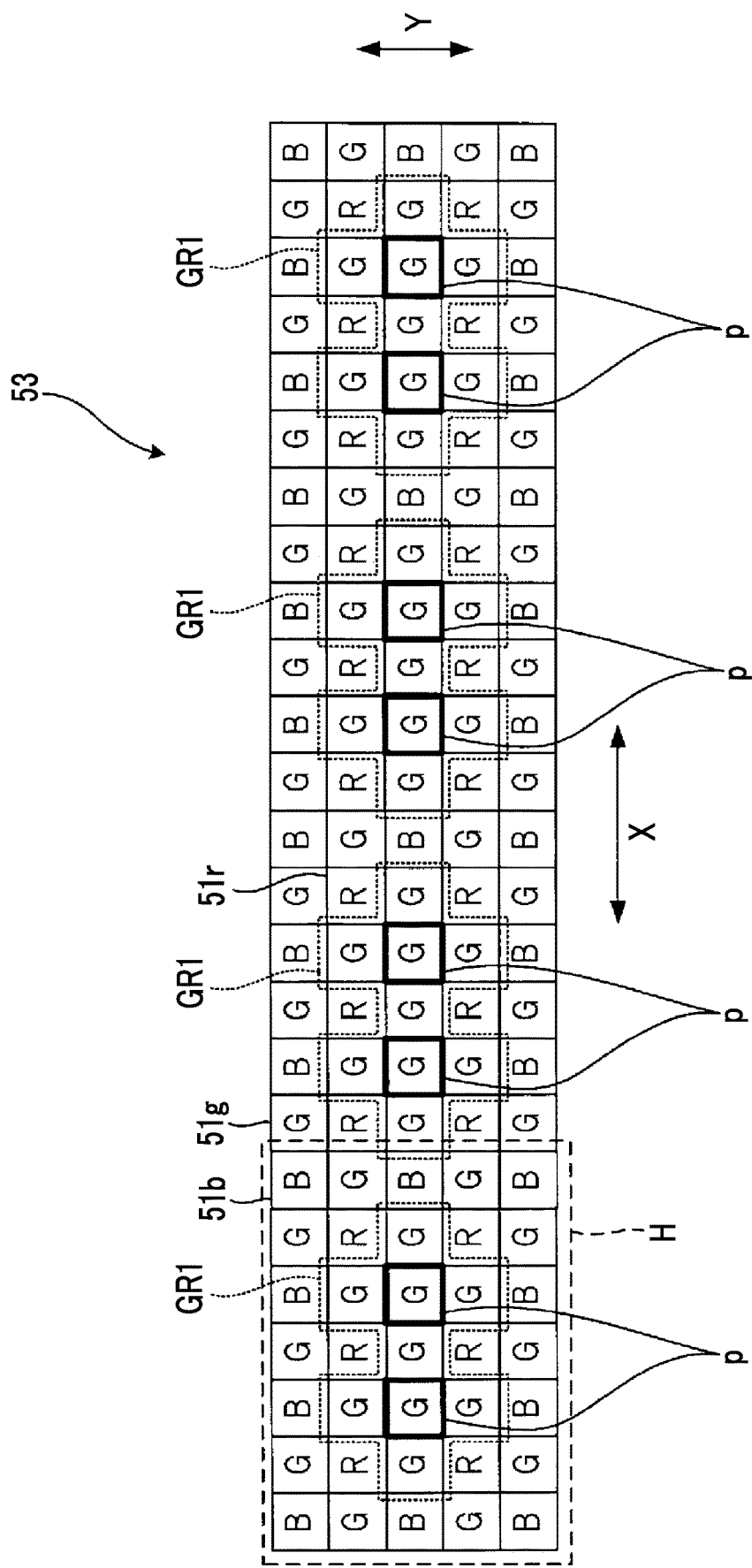
FIG. 3 is a partially enlarged view of one AF area 53 shown in FIG. 2.

FIG. 3 is a partially enlarged view of one AF area 53 shown in FIG. 2.

In the AF area 53, three types of pixels that detect different colors (an R pixel 51r that detects red light through a red filter transmitting red light, a G pixel 51g that detects green light through a green filter transmitting green light, and a B pixel 51b that detects blue light through a blue filter transmitting blue light) are arranged two-dimensionally.

In the following, in a case where it is not necessary to individually distinguish the R pixel 51r, the G pixel 51g, and the B pixel 51b, these are simply referred to as a pixel 51. A pixel 51 that detects the same color as a color detected by a predetermined pixel 51 is referred to as the same color pixel of the predetermined pixel 51. A pixel 51 that detects a color different from the color detected by the predetermined pixel 51 is referred to as a different color pixel of the predetermined pixel 51.

Each pixel 51 formed on the light-receiving surface 50 includes a photoelectric conversion unit such as a photodiode and a color filter formed above the photoelectric conversion unit. The pixels 51 included in the imaging element 5 are arranged two-dimensionally on the light-receiving surface 50 according to a Bayer pattern in which the color filters included in the pixels 51 are arranged in a Bayer pattern.

The Bayer pattern is a pattern in which different color pixels of the pixel 51 are arranged adjacent to top, bottom, left, and right of the pixel 51. Specifically, the Bayer pattern is a pattern in which G pixels 51g are arranged adjacent to top, bottom, left, and right of the R pixel 51r, the G pixels 51g are arranged adjacent to top, bottom, left, and right of the B pixel 51b, R pixels 51r are arranged adjacent to top and bottom of the G pixel 51g, and B pixels 51b are arranged adjacent to left and right of the G pixel 51g.

However, in the imaging element 5, a part of the B pixels 51b (B pixel 51b to be arranged at position surrounded by thick frame in FIG. 3) among the B pixels 51b formed on the light-receiving surface 50 is replaced with the G pixel 51g (also referred to as specific pixel). In the example of FIG. 3, four pairs p of the specific pixels arranged with one pixel in the row direction X are provided separately in the row direction X. The imaging element 5 may have a configuration in which a part of the R pixels 51r among the R pixels 51r formed on the light-receiving surface 50 is replaced with the G pixel 51g (specific pixel).

As a result, the imaging element 5 has a configuration in which first pixel groups GR1 composed of a total of nine G pixels 51g, including the two G pixels 51g of the pair p, the four G pixels 51g adjacent to top, bottom, left, and right of one G pixel 51g of the pair p, and the three G pixels 51g adjacent to top, bottom, and right of the other G pixel 51g of the pair p, are arranged separately in the row direction X. The first pixel groups GR1 are periodically and discretely arranged in the AF area 53. The pixels 51 excluding the first pixel group GR1 among the pixels 51 arranged on the light-receiving surface 50 are hereinafter referred to as a second pixel group.

A range H shown in FIG. 3 is a range including the first pixel group GR1 and the second pixel group around the first pixel group and indicates a range where 5 rows×7 columns=35 pixels 51 are arranged centered on the G pixel 51g between the pair p.

Figure 4:
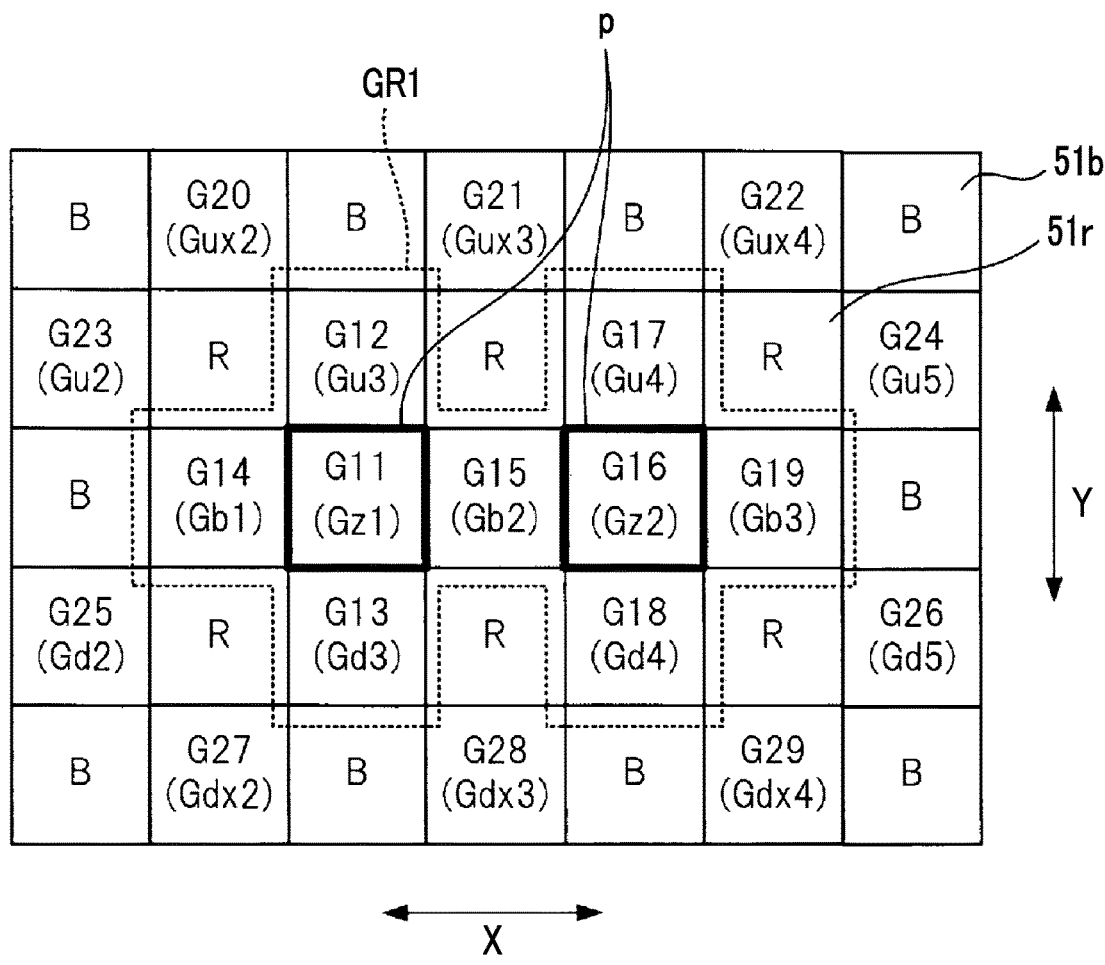
FIG. 4 is an enlarged view of a range H shown in FIG. 3.

FIG. 4 is an enlarged view of the range H shown in FIG. 3. In FIG. 4, each G pixel 51g in the range H is individually named in order to facilitate understanding of leakage light detection processing described below.

Specifically, the G pixel 51g on the left side of the pair p in the range H is a pixel G11. The G pixel 51g adjacent to top of the pixel G11 is a pixel G12, the G pixel 51g adjacent to bottom of the pixel G11 is a pixel G13, the G pixel 51g adjacent to left of the pixel G11 is a pixel G14, and the G pixel 51g adjacent to right of the pixel G11 is a pixel G15. The G pixel 51g on the right side of the pair p in the range H is a pixel G16. The G pixel 51g adjacent to top of the pixel G16 is a pixel G17, the G pixel 51g adjacent to bottom of the pixel G16 is a pixel G18, and the G pixel 51g adjacent to right of the pixel G16 is a pixel G19.

Each of the pixels G14, G11, G16, and G19 is the pixel for phase difference detection. Each of the pixel G11 and the pixel G19 has a first light receiving characteristic. Each of the pixel G14 and the pixel G16 has a second light receiving characteristic different from the first light receiving characteristic. The first light receiving characteristic is a characteristic that receives light that passes through one divided region in a case where a pupil region of the imaging optical system is divided in the row direction X. The second light receiving characteristic is a characteristic that receives light that passes through the other divided region of the pupil region. The pixel 51 of the pixel for phase difference detection among the pixels 51 formed on the light-receiving surface 50 is a pixel for imaging. The pixel for imaging is a pixel having a characteristic of receiving light that passes through the entire pupil region.

With a correlation calculation between a pixel value group output from a group of the pixels G14 and the pixels G16 included in four first pixel groups GR1 shown in FIG. 3 and a pixel value group output from a group of the pixels G11 and the pixels G19 included in the four first pixel groups GR1, it is possible to obtain a phase difference between these two pixel value groups. It is possible to focus on the subject by moving the focus lens based on this phase difference.

The pixel G19 constitutes a first pixel for phase difference detection, the pixel G16 constitutes a second pixel for phase difference detection, the pixel G11 constitutes a third pixel for phase difference detection, and the pixel G14 constitutes a fourth pixel for phase difference detection. Further, the pixel G15 constitutes a first pixel, the pixel G17 and the pixel G18 constitute a second pixel, and the pixel G12 and the pixel G13 constitute a third pixel.

Among the G pixels 51g included in the second pixel group in the range H, the G pixel 51g diagonally to top left of the pixel G12 is a pixel G20, the G pixel 51g diagonally to top right of the pixel G12 is a pixel G21, and the G pixel 51g on the left of the pixel G12 is a pixel G23. In the present specification, a G pixel 51g of the second pixel group in which a distance from a predetermined G pixel 51g included in the first pixel group GR1 is larger than an arrangement pitch of the pixels 51 and equal to or less than twice the arrangement pitch is referred to as a pixel close to this predetermined G pixel 51g. Therefore, the pixels G20, G21, and G23 are pixels close to the pixel G12, respectively.

Among the G pixels 51g included in the second pixel group in the range H, the G pixel 51g diagonally to bottom left of the pixel G13 is a pixel G27, the G pixel 51g diagonally to bottom right of the pixel G13 is a pixel G28, and the G pixel 51g on the left of the pixel G13 is a pixel G25. The pixels G25, G27, and G28 are pixels close to the pixel G13, respectively.

Among the G pixels 51g included in the second pixel group in the range H, the G pixel 51g diagonally to top right of the pixel G17 is a pixel G22, and the G pixel 51g on the right side of the pixel G17 is a pixel G24. The pixels G21, G22, and G24 are pixels close to the pixel G17, respectively.

Among the G pixels 51g included in the second pixel group in the range H, the G pixel 51g diagonally to bottom right of the pixel G18 is a pixel G29, and the G pixel 51g on the right of the pixel G18 is a pixel G26. The pixels G26, G28, and G29 are pixels close to the pixel G18, respectively.

In FIG. 4, a description in parentheses written in each G pixel 51g indicates a pixel value output from the G pixel 51g.

At least one same color pixel is adjacent to each G pixel 51g included in the first pixel group GR1 in the range H shown in FIG. 3. Therefore, leakage of light (leakage light) may occur from the same color pixel adjacent to the G pixel 51g for each G pixel 51g.

The leakage light to the G pixel 51g refers to a phenomenon in which a part of the light that passes through a color filter of the same color pixel adjacent to the G pixel 51g passes through a color filter of the G pixel 51g and the G pixel 51g and is incident on the photoelectric conversion unit. In a case where such leakage light occurs, the pixel value of the pixel G51g that receives the leakage light is higher than an actual value.

On the other hand, in the second pixel group, only the different color pixels are present adjacent to each pixel 51. Therefore, even in a case where a part of the light that passes through a color filter of the different color pixel adjacent to the pixel 51 is incident on the color filter of the pixel 51 of the second pixel group, this part of the light can hardly pass through the color filter of the pixel 51. Therefore, it is not necessary to consider the leakage light in the second pixel group.

As described above, the pixel value may increase due to the leakage light for each G pixel 51g of the first pixel group GR1. Therefore, with the detection of the leakage light with high accuracy, it is possible to correct the pixel value affected by the leakage light and the like, and thus it is possible to improve the image quality of the imaging element 5. In the digital camera 100, the system control unit 11 detects the leakage light that may occur in the first pixel group GR1. Hereinafter, the leakage light detection processing and the like will be described in detail.

Figure 5:
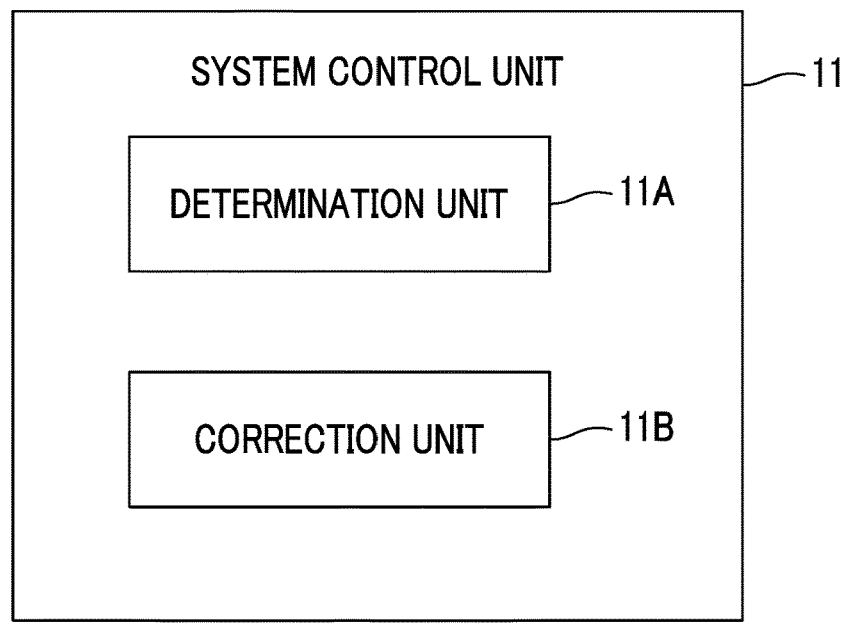
FIG. 5 is a functional block diagram of a system control unit 11 of the digital camera 100 shown in FIG. 1.

FIG. 5 is a functional block diagram of the system control unit 11 of the digital camera 100 shown in FIG. 1.

The system control unit 11 executes a program including the leakage light detection program to function as a leakage light detection device comprising a determination unit 11A and a correction unit 11B.

The determination unit 11A determines whether or not the leakage light occurs from the same color pixel adjacent to the pixel to be detected based on the pixel value of each G pixel 51g in the range H shown in FIG. 3 with at least one of the G pixels 51g included in the first pixel group GR1 in the range H shown in FIG. 3, excluding the specific pixel (G pixel 51g surrounded by thick frame), as a pixel to be detected. The determination unit 11A repeats this determination for all the first pixel groups GR1 provided on the light-receiving surface 50.

The correction unit 11B corrects the pixel value of the pixel to be detected based on the determination result of the presence or absence of the leakage light by the determination unit 11A. Specifically, in a case where the number of the first pixel groups GR1 including the pixel to be detected which is determined to have the leakage light by the determination unit 11A is N or more and is locally present with N as a natural number of 2 or more, the correction unit 11B corrects the pixel value of the pixel to be detected, which is determined to have the leakage light, included in the N first pixel groups GR1.

For example, in a case where N or more first pixel groups GR1 including the pixel to be detected, which is determined to have the leakage light, are continuously arranged in the row direction X or in a case where N or more first pixel groups GR1 including the pixel to be detected, which is determined to have the leakage light, are continuously arranged in the column direction Y, the correction unit 11B determines that N or more first pixel groups GR1 are locally present and performs the above correction.

For the correction of the pixel value of the pixel to be detected, a method such as replacing with the pixel value of the pixel to be detected which is determined to have no leakage light and is close to the pixel to be detected or the pixel value of the same color pixel of the second pixel group close to the pixel to be detected may be employed.

Hereinafter, processing of the determination unit 11A will be described in detail. In the following, processing of determining the presence or absence of the leakage light to each pixel to be detected by using each of the pixels G12, G13, G15, G17, and G18 of the first pixel group GR1 shown in FIG. 4 as the pixel to be detected will be described. The reason why the pixels G14, G11, G16, and G19 are not set as the pixel to be detected is that the pixels are the pixels for phase difference detection and it is premised that output signals of the pixels are corrected by interpolation or the like.

(Processing A: Processing of Determining Presence or Absence of Leakage Light to Pixel G12)

The determination unit 11A sets the pixels of the first pixel group GR1 (here, pixels G14 and G13) that are close to the pixel to be detected and in which the pixel 51 that detects a color other than green, which is a detection color of the pixel to be detected, is arranged adjacent to a direction (bottom direction in FIG. 4) from the pixel G12, which is the pixel to be detected, toward the same color pixel (pixel G11) adjacent to the pixel G12, as pixels for determination.

In a case where the leakage light to the pixel G12 occurs, a traveling direction of the leakage light is from bottom to top. Thus, the pixels G14 and G13 in which the different color pixels are arranged adjacent to bottom are set as the pixels for determination. With the setting of the pixel for determination in this manner, in a case where the leakage light occurs in the pixel G12, a pixel value Gu3 is sufficiently larger than pixel values Gb1 and Gd3. Therefore, determination can be made that the leakage light occurs.

Specifically, the determination unit 11A determines whether or not the following conditions (A1) and (A2) are both satisfied and determines that the leakage light from the bottom toward the top occurs with respect to the pixel G12 in a case where both (A1) and (A2) are satisfied. A threshold value TH is a positive value larger than a difference between two pixel values that may occur due to noise or the like. The determination results of the conditions (A1) and (A2) constitute a first comparison result.

$$Gu3-Gb1 \geq \text{threshold value } TH \quad (A1)$$

$$Gu3-Gd3 \geq \text{threshold value } TH \quad (A2)$$

The determination unit 11A may further use a comparison result of pixel values Gu2, Gux2, and Gux3 of the same color pixels (for example, pixels G20, G21, and G23) of the pixel G12 close to the pixel G12 of the second pixel group in the range H and the pixel value Gu3 to improve the determination accuracy of the presence or absence of the leakage light.

Specifically, the determination unit 11A makes determination for the following conditions (A3), (A4), and (A5) and determines that the leakage light from the bottom toward the top occurs with respect to the pixel G12 in a case where all the conditions (A1) to (A5) are satisfied. The determination results of the conditions (A3) to (A5) constitute a fourth comparison result.

$$Gu3-Gu2 \geq \text{threshold value } TH \quad (A3)$$

$$Gu3-Gux2 \geq \text{threshold value } TH \quad (A4)$$

$$Gu3-Gux3 \geq \text{threshold value } TH \quad (A5)$$

As another modification example, the determination unit 11A may determine only one of the conditions (A1) and (A2), and may determine that the leakage light occurs in a case where any one of these conditions is satisfied. The determination unit 11A may determine only for any one of the conditions (A1) and (A2) and any one of the conditions (A3) to (A5), and may determine that the leakage light occurs in a case where these two conditions are satisfied.

(Processing B: Processing of Determining Presence or Absence of Leakage Light to Pixel G17)

The determination unit 11A sets the pixels of the first pixel group GR1 (here, pixels G18 and G19) that are close to the pixel to be detected and in which the pixel 51 that detects a color other than green is arranged adjacent to a direction (bottom direction in FIG. 4) from the pixel G17, which is the pixel to be detected, toward the same color pixel (pixel G16) adjacent to the pixel G17, as the pixels for determination.

The determination unit 11A determines whether or not all of the following conditions (B1) and (B2) are satisfied and determines that the leakage light from the bottom toward the top occurs with respect to the pixel G17 in a case where both (B1) and (B2) are satisfied. The determination results of the conditions (B1) and (B2) constitute the first comparison result.

$$Gu4-Gb3 \geq \text{threshold value } TH \qquad (B1)$$

$$Gu4-Gd4 \geq \text{threshold value } TH \qquad (B2)$$

The determination unit 11A may further use a comparison result of pixel values Gu5, Gux3, and Gux4 of the same color pixels (for example, pixels G21, G22, and G24) of the pixel G17 close to the pixel G17 of the second pixel group in the range H and the pixel value Gu4 to improve the determination accuracy of the presence or absence of the leakage light.

Specifically, the determination unit 11A makes determination for the following conditions (B3), (B4), and (B5) and determines that the leakage light from the bottom toward the top occurs with respect to the pixel G17 in a case where all the conditions (B1) to (B5) are satisfied. The determination results of the conditions (B3) to (B5) constitute the fourth comparison result.

$$Gu4-Gu5 \geq \text{threshold value } TH \qquad (B3)$$

$$Gu4-Gux4 \geq \text{threshold value } TH \qquad (B4)$$

$$Gu4-Gux3 \geq \text{threshold value } TH \qquad (B5)$$

As another modification example, the determination unit 11A may determine only one of the conditions (B1) and (B2), and may determine that the leakage light occurs in a case where any one of these conditions is satisfied. The determination unit 11A may determine only for any one of the conditions (B1) and (B2) and any one of the conditions (B3) to (B5), and may determine that the leakage light occurs in a case where these two conditions are satisfied.

The pixels G12 and G17 set as the pixels to be detected in the processing A and the processing B are close to each other. Therefore, in a case where the leakage light occurs in one pixel, there is a high possibility that the leakage light occurs in the other pixel. Therefore, in a case where all the conditions used for the processing A and the processing B are satisfied, the determination unit 11A may determine that the leakage light occurs in the pixels G12 and G17. In a case where any one of the conditions used for the processing A and the processing B is not satisfied, the determination unit 11A may determine that the leakage light does not occur in the pixels G12 and G17. With the above, it is possible to improve the detection accuracy of the leakage light.

(Processing C: Processing of Determining Presence or Absence of Leakage Light to Pixel G13)

The determination unit 11A sets the pixels of the first pixel group GR1 (here, pixels G14 and G12) that are close to the pixel to be detected and in which the pixel 51 that detects a color other than green is arranged adjacent to a direction (top direction in FIG. 4) from the pixel G13, which is the pixel to be detected, toward the same color pixel (pixel G11) adjacent to the pixel G13, as the pixels for determination.

in a case where the leakage light to the pixel G13 occurs, the traveling direction of the leakage light is from the top to the bottom. Thus, the pixels G14 and G12 in which the different color pixels are arranged adjacent to top are set as the pixels for determination. With the setting of the pixel for determination in this manner, in a case where the leakage light occurs in the pixel G13, the pixel value Gd3 is sufficiently larger than the pixel values Gb1 and Gu3. Therefore, determination can be made that the leakage light occurs.

Specifically, the determination unit 11A determines whether or not all of the following conditions (C1) and (C2) are satisfied and determines that the leakage light from the top toward the bottom occurs with respect to the pixel G13 in a case where both (C1) and (C2) are satisfied. The determination results of the conditions (C1) and (C2) constitute the first comparison result.

$$Gd3-Gb1 \geq \text{threshold value } TH \qquad (C1)$$

$$Gd3-Gu3 \geq \text{threshold value } TH \qquad (C2)$$

The determination unit 11A may further use a comparison result of pixel values Gd2, Gdx2, and Gdx3 of the same color pixels (for example, pixels G25, G27, and G28) of the pixel G13 close to the pixel G13 of the second pixel group in the range H and the pixel value Gd3 to improve the determination accuracy of the presence or absence of the leakage light.

Specifically, the determination unit 11A makes determination for the following conditions (C3), (C4), and (C5) and determines that the leakage light from the top toward the bottom occurs with respect to the pixel G13 in a case where all the conditions (C1) to (C5) are satisfied. The determination results of the conditions (C3) to (C5) constitute the fourth comparison result.

$$Gd3-Gd2 \geq \text{threshold value } TH \qquad (C3)$$

$$Gd3-Gdx2 \geq \text{threshold value } TH \qquad (C4)$$

$$Gd3-Gdx3 \geq \text{threshold value } TH \qquad (C5)$$

As another modification example, the determination unit 11A may determine only one of the conditions (C1) and (C2), and may determine that the leakage light occurs in a case where any one of these conditions is satisfied. The determination unit 11A may determine only for any one of the conditions (C1) and (C2) and any one of the conditions (C3) to (C5), and may determine that the leakage light occurs in a case where these two conditions are satisfied.

(Processing D: Processing of Determining Presence or Absence of Leakage Light to Pixel G18)

The determination unit 11A sets the pixels of the first pixel group GR1 (here, pixels G17 and G19) that are close to the pixel to be detected and in which the pixel 51 that detects a color other than green is arranged adjacent to a direction (top direction in FIG. 4) from the pixel G18, which is the pixel to be detected, toward the same color pixel (pixel G16) adjacent to the pixel G18, as the pixels for determination.

The determination unit 11A determines whether or not all of the following conditions (D1) and (D2) are satisfied and determines that the leakage light from the top toward the bottom occurs with respect to the pixel G18 in a case where both (D1) and (D2) are satisfied. The determination results of the conditions (D1) and (D2) constitute the first comparison result.

$$Gd4 - Gb3 \geq \text{threshold value } TH \quad (D1)$$

$$Gd4 - Gu4 \geq \text{threshold value } TH \quad (D2)$$

The determination unit 11A may further use a comparison result of pixel values Gd5, Gdx3, and Gdx4 of the same color pixels (for example, pixels G26, G28, and G29) of the pixel G18 close to the pixel G18 of the second pixel group in the range H and the pixel value Gd4 to improve the determination accuracy of the presence or absence of the leakage light.

Specifically, the determination unit 11A makes determination for the following conditions (D3), (D4), and (D5) and determines that the leakage light from the top toward the bottom occurs with respect to the pixel G18 in a case where all the conditions (D1) to (D5) are satisfied. The determination results of the conditions (D3) to (D5) constitute the fourth comparison result.

$$Gd4 - Gd5 \geq \text{threshold value} TH \quad (D3)$$

$$Gd4 - Gdx4 \geq \text{threshold value} TH \quad (D4)$$

$$Gd4 - Gdx3 \geq \text{threshold value } TH \quad (D5)$$

As another modification example, the determination unit 11A may determine only one of the conditions (D1) and (D2), and may determine that the leakage light occurs in a case where any one of these conditions is satisfied. The determination unit 11A may determine only for any one of the conditions (D1) and (D2) and any one of the conditions (D3) to (D5), and may determine that the leakage light occurs in a case where these two conditions are satisfied.

The pixels G13 and G18 set as the pixels to be detected in the processing C and the processing D are close to each other. Therefore, in a case where the leakage light occurs in one pixel, there is a high possibility that the leakage light occurs in the other pixel. Therefore, in a case where all the conditions used for the processing C and the processing D are satisfied, the determination unit 11A may determine that the leakage light occurs in the pixels G13 and G18. In a case where any one of the conditions used for the processing C and the processing D is not satisfied, the determination unit 11A may determine that the leakage light does not occur in the pixels G13 and G18. With the above, it is possible to improve the detection accuracy of the leakage light.

(Processing E: Processing of Determining Presence or Absence of Leakage Light to Pixel G15)

Pixel G15 has the same color pixels on the left and right. Therefore, both the leakage light in a direction from the right toward the left and the leakage light in a direction from the left toward the right may occur. Thus, the determination unit 11A sets the pixels of the first pixel group GR1 (here, pixels G13 and G18) in which the pixel 51 that detects a color other than green is arranged adjacent to a direction (right direction in FIG. 4) from the pixel G15, which is the pixel to be detected, toward the same color pixel (pixel G16) adjacent to right of the pixel G15, as the pixels for determination. The determination unit 11A sets the pixels of the first pixel group GR1 (here, pixels G12 and G17) in which the pixel 51 that detects a color other than green is arranged adjacent to a direction (left direction in FIG. 4) from the pixel G15 toward the same color pixel (pixel G11) adjacent to left of the pixel G15, as the pixels for determination.

The determination unit 11A determines whether or not the following conditions (E1) to (E4) are both satisfied and determines that the leakage light from the left toward the right or the leakage light from the right toward the left occurs with respect to the pixel G15 in a case where all of the conditions (E1) to (E4) are satisfied. The determination results of the conditions (E1) to (E4) constitute the first comparison result.

$$Gb2 - Gu3 \geq \text{threshold value } TH \quad (E1)$$

$$Gb2 - Gu4 \geq \text{threshold value } TH \quad (E2)$$

$$Gb2 - Gd3 \geq \text{threshold value } TH \quad (E3)$$

$$Gb2 - Gd4 \geq \text{threshold value } TH \quad (E4)$$

The determination unit 11A may determine only the conditions (E1) and (E3), and may determine that the leakage light occurs in a case where both of these two conditions are satisfied. Alternatively, the determination unit 11A may determine only the conditions (E2) and (E4), and may determine that the leakage light occurs in a case where both of these two conditions are satisfied. Alternatively, the determination unit 11A may determine only one of the conditions (E1) to (E4), and may determine that the leakage light occurs in a case where this condition is satisfied.

(Processing F: Processing of Determining Traveling Direction of Leakage Light to Pixel G15)

Processing F is processing required in a case where determination is made that the leakage light occurs as a result of performing the processing E, and is a processing of determining the traveling direction of the leakage light.

The determination unit 11A selects the pixel G19 having the different color pixel adjacent to right and the same color pixel adjacent to left among the G pixels 51g other than the pixel G15 of the first pixel group GR1. The determination unit 11A selects the G pixel 51g having the same color pixel adjacent to right among the G pixels 51g other than the pixel G15 of the first pixel group GR1. However, the pixel G19 selected above is the pixel for phase difference detection. Therefore, the determination unit 11A selects the pixel G11 having the same color pixel adjacent to right and the same light receiving characteristic as the pixel G19 among the G pixels 51g other than the pixel G15 of the first pixel group GR1.

The determination unit 11A selects the pixel G14 having the different color pixel adjacent to left and the same color pixel adjacent to right among the G pixels 51g other than the pixel G15 of the first pixel group GR1. The determination unit 11A selects the G pixel 51g having the same color pixel adjacent to left among the G pixels 51g other than the pixel G15 of the first pixel group GR1. However, the pixel G14 selected above is the pixel for phase difference detection. Therefore, the determination unit 11A selects the pixel G16 having the same color pixel adjacent to left and the same light receiving characteristic as the pixel G14 among the G pixels 51g other than the pixel G15 of the first pixel group GR1.

The determination unit 11A determines whether or not the following conditions (F1) and (F2) are satisfied, determines that the leakage light from the right toward the left with respect to the pixel G15 in a case where (F1) is satisfied, and determines that the leakage light from the left toward the right with respect to the pixel G15 in a case where (F2) is satisfied.

$$Gz1 - Gb3 \geq \text{threshold value } TH \quad (F1)$$

$$Gz2 - Gb1 \geq \text{threshold value } TH \quad (F2)$$

The determination result of the condition (F1) constitutes a second comparison result, and the determination result of the condition (F2) constitutes a third comparison result.

The processing B and processing D are not essential and can be omitted.

In a case where determination is made that the leakage light occurs in any one of the above processing A to E, the determination unit 11A may determine that the leakage light occurs in the arrangement area of the first pixel group GR1 as the determination target. However, an operation of further improving the accuracy will be described below.

Figure 6:
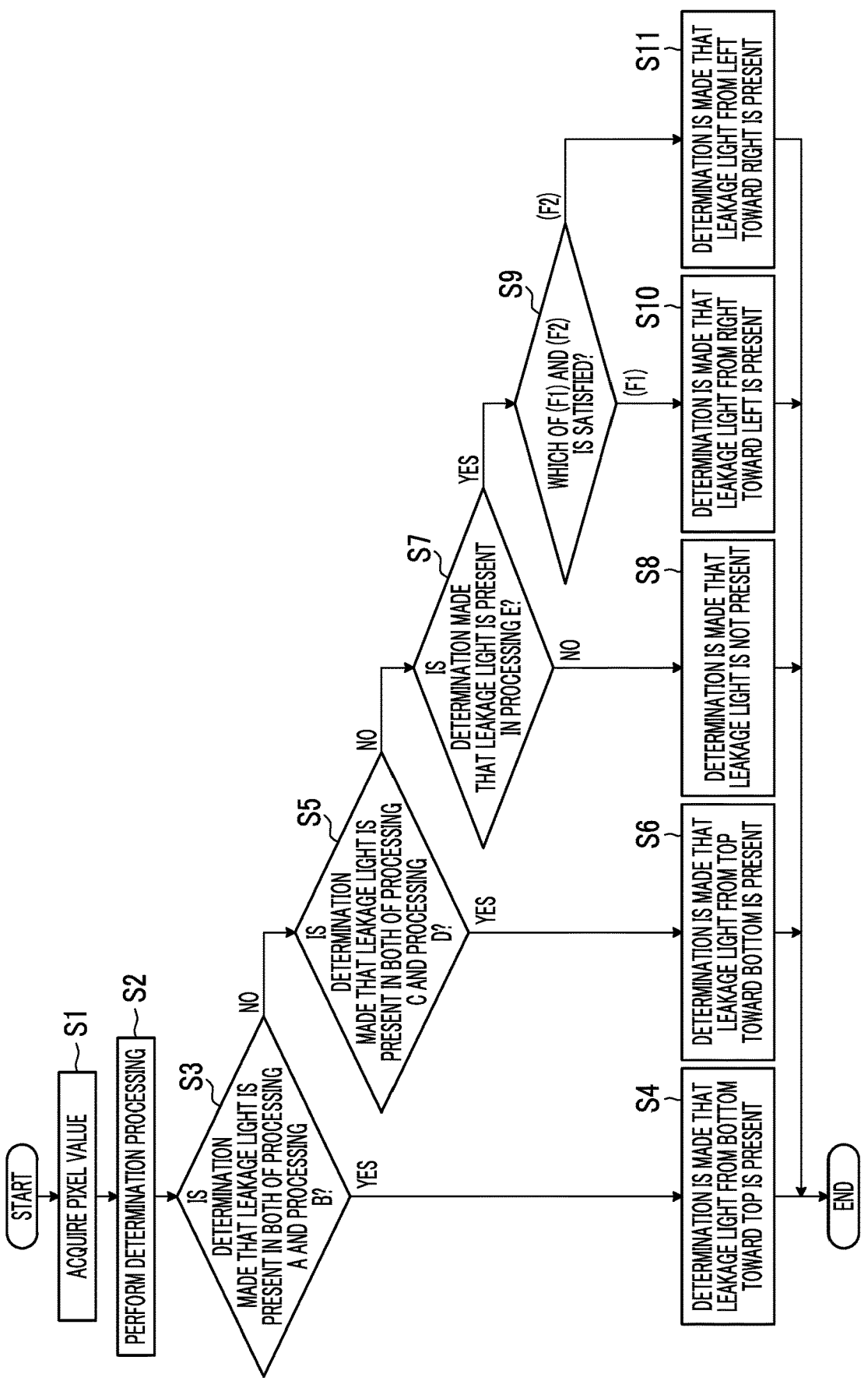
FIG. 6 is a flowchart for describing an operation example of a determination unit 11A.

FIG. 6 is a flowchart for describing an operation example of the determination unit 11A. The determination unit 11A performs processing shown in FIG. 6 for each of the first pixel group GR1 provided on the light-receiving surface 50.

First, the determination unit 11A acquires the pixel values of all the G pixels 51g in the range H including the first pixel group GR1 to be processed (step S1). Next, the determination unit 11A performs the pieces of processing from the processing A to the processing F based on the acquired pixel values (step S2).

Next, in a case where the determination unit 11A refers to the results of the processing A and the processing B (step S3) and determines that the leakage light occurs in both the processing A and the processing B (step S3: YES), the determination unit 11A determines that the leakage light from the bottom toward the top occurs in the first pixel group GR1 (step S4).

The determination unit 11A refers to the results of the processing C and the processing D (step S5) in a case where determination is made that the leakage light does not occur in one or both of the processing A and the processing B (step S3: NO), and determines that the leakage light from the top toward the bottom occurs in the first pixel group GR1 (step S6) in a case where determination is made that the leakage light occurs in both of the processing C and the processing D (step S5: YES).

The determination unit 11A refers to the result of the processing E (step S7) in a case where determination is made that the leakage light does not occur in one or both of the processing C and the processing D (step S5: NO), and determines that the leakage light does not occur in the first pixel group GR1 (step S8) in a case where determination is made that the leakage light does not occur in the processing E (step S7: NO).

The determination unit 11A refers to the result of the processing F (step S9) in a case where determination is made that the leakage light does not occur in the processing E (step S7: YES), determines that the leakage light from the right toward the left occurs in the first pixel group GR1 (step S10) in a case where the condition (F1) is satisfied, and determines that the leakage light from the left toward the right occurs in the first pixel group GR1 (step S11) in a case where the condition (F2) is satisfied.

In FIG. 6, the processing F may not be performed in step S2. In a case where step S7 is YES, determination may be made that the leakage light toward the row direction X occurs and the processing may be ended. Even in this case, the traveling direction of the leakage light can be distinguished in three directions.

The first pixel group GR1 is composed of the pixels 51 arranged close to each other or adjacent to each other. Therefore, in a case where the leakage light traveling in a specific direction occurs in step S4, S6, S10, or S11, it can be considered that oblique light traveling in a specific direction occurs in the entire first pixel group GR1.

Therefore, for example, in a case where the processing of step S4 is performed, the correction unit 11B may use the pixel value of the G pixel 51g of the second pixel group located on the bottom side of the first pixel group GR1 to correct an output value of each pixel of the first pixel group GR1. In a case where the processing of step S6 is performed, the correction unit 11B may use the pixel value of the G pixel 51g of the second pixel group located on the top side of the first pixel group GR1 to correct the output value of each pixel of the first pixel group GR1. In a case where the processing of step S10 is performed, the correction unit 11B may use the pixel value of the G pixel 51g of the second pixel group located on the left side of the first pixel group GR1 to correct the output value of each pixel of the first pixel group GR1. In a case where the processing of step S11 is performed, the correction unit 11B may use the pixel value of the G pixel 51g of the second pixel group located on the right side of the first pixel group GR1 to correct the output value of each pixel of the first pixel group GR1.

As described above, with the digital camera 100, the pixel values of the G pixels 51g (in other words, G pixels 51g in which the same color pixel is always present adjacent to G pixel 51g) included in the first pixel group GR1 are compared with each other to determine the presence or absence of the leakage light to the pixel to be detected. Therefore, it is possible to detect the leakage light with high accuracy.

Figure 7:
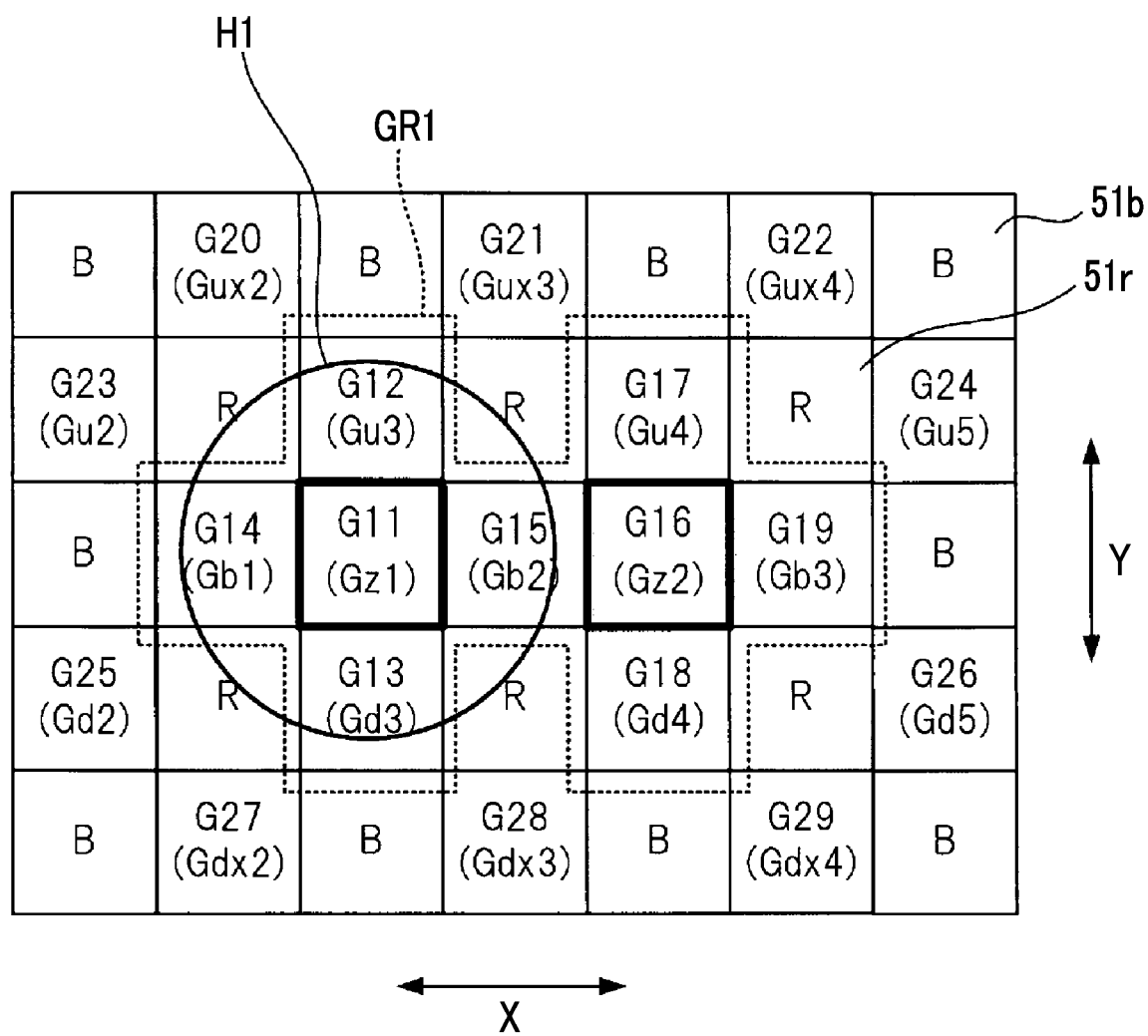
FIG. 7 is a view of a state where an image of a high-brightness subject is formed around a pixel G11 shown in FIG. 4.

For example, a case where an image of a high-brightness subject H1 is formed on 3 rows×3 columns=9 pixels 51 centered on the pixel G11 is assumed as shown in FIG. 7. In a case where such a high-brightness subject H1 is in the vicinity of the pixel G11, there is a high possibility that the leakage light to the same color pixel adjacent to the pixel G11 occurs.

In a case where the leakage light does not occur in the pixel G12 in the state of FIG. 7, the pixel value of the pixel G12 or the pixel G14 adjacent to the pixel G11 become a large value due to the high-brightness subject H1, and a difference between these pixel values is small. On the other hand, the pixel value Gux2 of the pixel G20 or the pixel value Gu2 of the pixel G23, which is located far from the pixel G11, is smaller than the pixel value Gu3.

On the other hand, in a case where the leakage light occurs in the pixel G12 in the state of FIG. 7, the pixel value Gu3 of the pixel G12 adjacent to the pixel G11 is larger than the pixel value Gb1 of the pixel G14 or the pixel value Gd3 of the pixel G13, which is adjacent to the pixel G11. On the other hand, the pixel value Gux2 of the pixel G20 or the pixel value Gu2 of the pixel G23, which is located far from the pixel G11, is smaller than the pixel value Gu3.

That is, with simple comparison between the pixel value of the pixel G12 adjacent to the pixel G11, which tends to be a source of the leakage light and the pixel value of the distant pixel G20 or G23 not adjacent to the pixel G11, it is not possible to distinguish whether the increase in the pixel value Gu3 is caused by the high-brightness subject H1 or the leakage light. On the contrary, in the present embodiment, with the comparison between the pixel values of the G pixels 51g adjacent to the pixel G11, it is possible to distinguish between a state with the high-brightness subject and with the leakage light and a state with the high-brightness subject and without the leakage light and thus improve the detection accuracy of leakage light.

In a configuration in which five same color pixels are continuously arranged in one direction due to the presence of a specific pixel pair as in the first pixel group GR1, in a case where the pixel G15 is set as the pixel to be detected, determination can be made by at least one of (E1) to (E4) that one or both of the leakage light from the right toward the right and the leakage light from the right toward the left occur. Therefore, it is possible to simplify processing of detecting the leakage light in the left-right direction.

An embodiment of the present invention can be employed as long as the imaging element 5 has a configuration in which a part of the pixels 51 arranged in a pattern in which the different color pixels are present at the top, bottom, left, and right is replaced with the pixel 51 that detects another color and thus at least three pixels 51 having the same color pixels adjacent to the pixel 51 are continuously arranged in the row direction X, the column direction Y, or both directions. For example, examples of the modification example include configurations of FIGS. 7 and 8.

Figure 8:
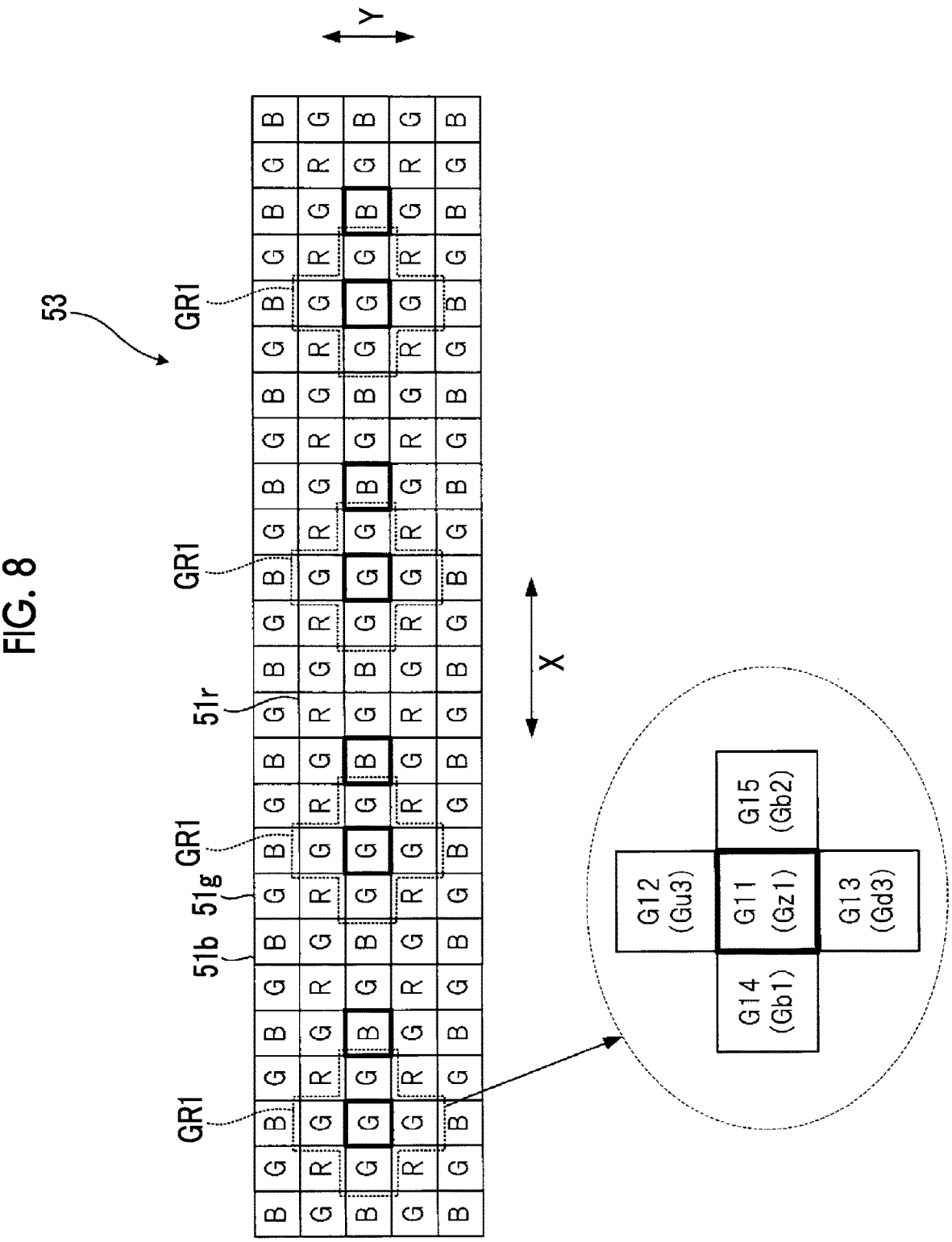
FIG. 8 is a partially enlarged view of a first modification example of one AF area 53 shown in FIG. 2.

FIG. 8 is a partially enlarged view of a first modification example of one AF area 53 shown in FIG. 2. In the example shown in FIG. 8, the G pixel 51$g$ on the right side of each pair p in FIG. 3 is changed to the B pixel 51$b$, and the configuration of the first pixel group GR1 is changed to be composed of the G pixel 51$g$ on the left side of a pair p1 and the G pixels 51$g$ of the top, bottom, left, and right of the G pixel 51$g$ thereon. A name of each pixel 51 of the first pixel group GR1 shown in FIG. 8 is the same as that in FIG. 4. The pixels 51 adjacent to right and adjacent to two pixels to the right of the pixel G15 of the first pixel group GR1 are not the pixels for phase difference detection but the pixels for imaging, respectively.

In the digital camera 100 including the imaging element 5 having the configuration shown in FIG. 8, the determination unit 11A can determine the presence or absence of the occurrence of the leakage light from the top toward the bottom and the presence or absence of the occurrence of the leakage light from the bottom toward the top by performing the processing A and the processing C.

The determination unit 11A determines whether or not the following conditions (G1) and (G2) are satisfied with the pixel G15 as the pixel to be detected and the pixels G12 and G13 as the pixels for determination, and can determine that the leakage light from the left to the right occurs in the pixel G15 in a case where all of these conditions are satisfied.

$$Gb2-Gu3 \geq \text{threshold value } TH \quad (G1)$$

$$Gb2-Gd3 \geq \text{threshold value } TH \quad (G2)$$

The determination unit 11A determines whether or not the following conditions (G3) and (G4) are satisfied with the pixel G14 as the pixel to be detected and the pixels G12 and G13 as the pixels for determination, and can determine that the leakage light from the right to the left occurs in the pixel G14 in a case where all of these conditions are satisfied.

$$Gb1-Gu3 \geq \text{threshold value } TH \quad (G3)$$

$$Gb1-Gd3 \geq \text{threshold value } TH \quad (G4)$$

Figure 9:
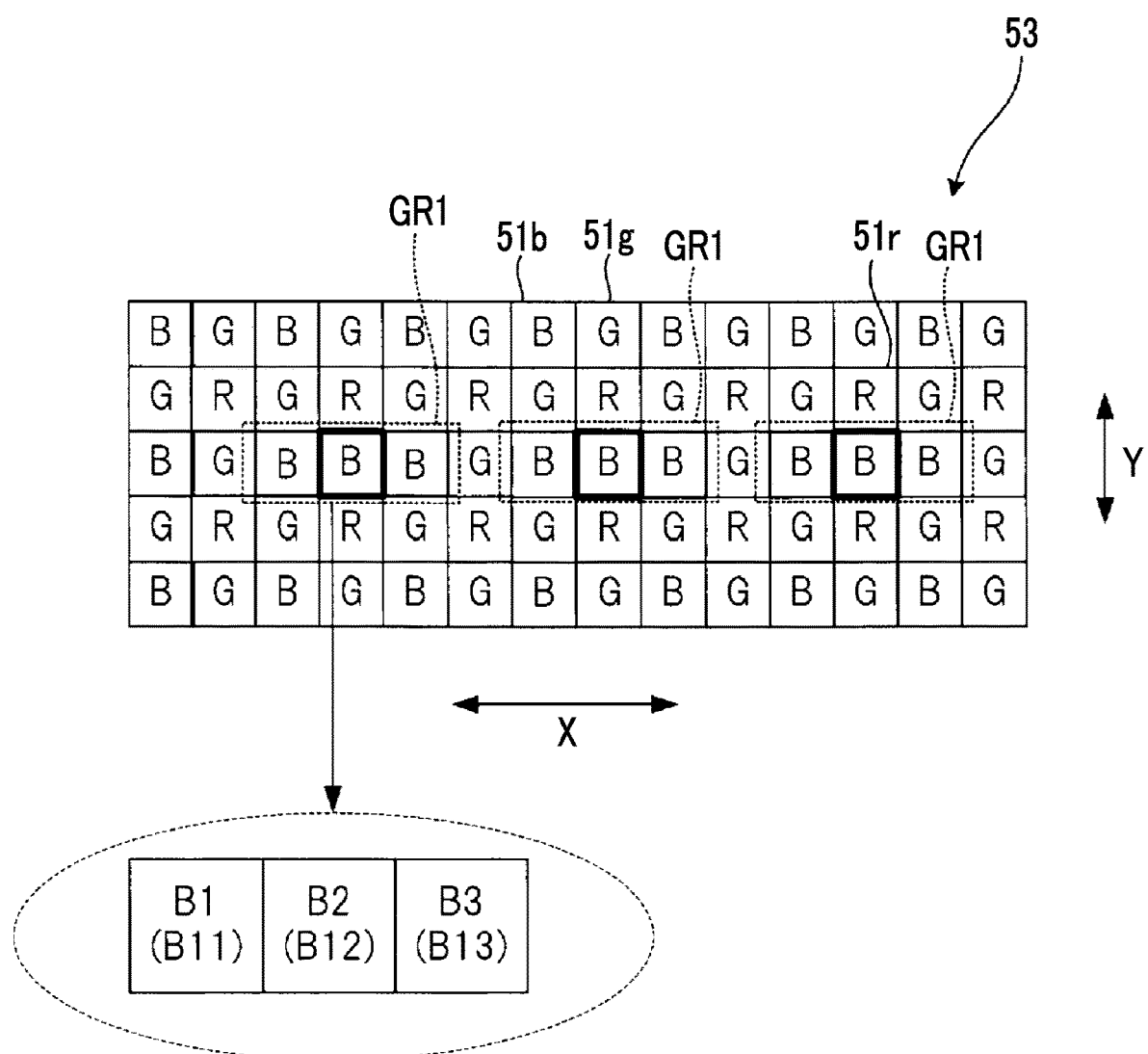
FIG. 9 is a partially enlarged view of a second modification example of one AF area 53 shown in FIG. 2.

FIG. 9 is a partially enlarged view of a second modification example of one AF area 53 shown in FIG. 2. The example shown in FIG. 9 shows an example in which a part of the G pixels 51$g$ among the pixels 51 arranged in the Bayer pattern is replaced with the B pixel 51$b$. The pixels surrounded by the thick frame in the figure indicate pixels at the positions where the G pixels 51$g$ are required to be arranged according to the Bayer pattern. In this configuration, the B pixel 51$b$ in the thick frame constitutes the specific pixel, and the first pixel group GR1 is composed of the specific pixel and the B pixel 51$b$ adjacent to left and right of the specific pixel. As shown in FIG. 9, each pixel of the first pixel group GR1 is composed of pixels B1, B2, and B3. The pixels B1 and B2 are the pixels for phase difference detection having different light receiving characteristics.

In the digital camera 100 including the imaging element 5 having the configuration shown in FIG. 9, the determination unit 11A determines whether or not the following condition (J1) is satisfied with the pixel B1 as the pixel to be detected and the pixel B3 as the pixel for determination, and can determine that the leakage light from the right to the left occurs in the pixel B1 in a case where the condition is satisfied.

$$B11-B13 \geq \text{threshold value } TH \quad (J1)$$

The determination unit 11A determines whether or not the following condition (J2) is satisfied with the pixel B3 as the pixel to be detected and the pixel B1 as the pixel for determination, and can determine that the leakage light from the left to the right occurs in the pixel B3 in a case where the condition is satisfied.

$$B13-B11 \geq \text{threshold value } TH \quad (J2)$$

In FIG. 9, the specific pixel is the B pixel 51$b$, but even in a case where a part of the R pixels 51$r$ is set as the specific pixel, it is possible to detect the leakage light with high accuracy.

Next, a configuration of a smartphone will be described as an embodiment of the imaging device of the present invention.

Figure 10:
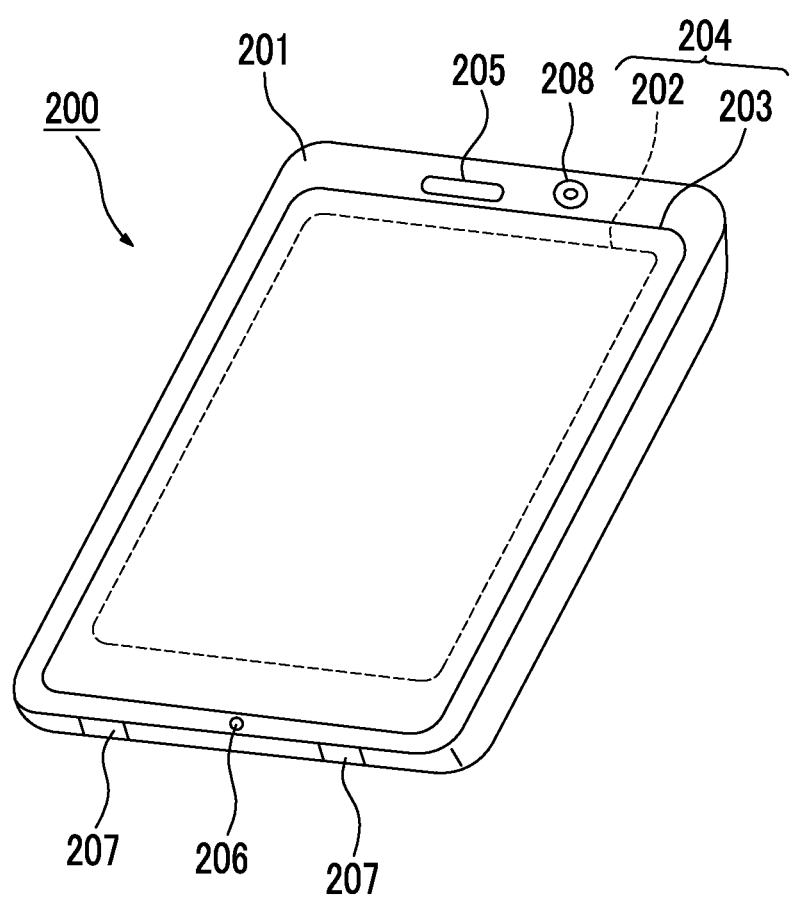
FIG. 10 shows an appearance of a smartphone 200 which is an embodiment of the imaging device of the present invention.

FIG. 10 shows an appearance of a smartphone 200 which is an embodiment of the imaging device of the present invention.

The smartphone 200 shown in FIG. 10 has a flat housing 201 and comprises a display input unit 204 in which a display panel 202 as a display unit and an operation panel 203 as an input unit are integrated on one surface of the housing 201.

The housing 201 comprises a speaker 205, a microphone 206, an operation unit 207, and a camera unit 208. A configuration of the housing 201 is not limited thereto. For example, a configuration in which the display unit and the input unit are independent or a configuration having a folded structure or a slide mechanism can be employed.

Figure 11:
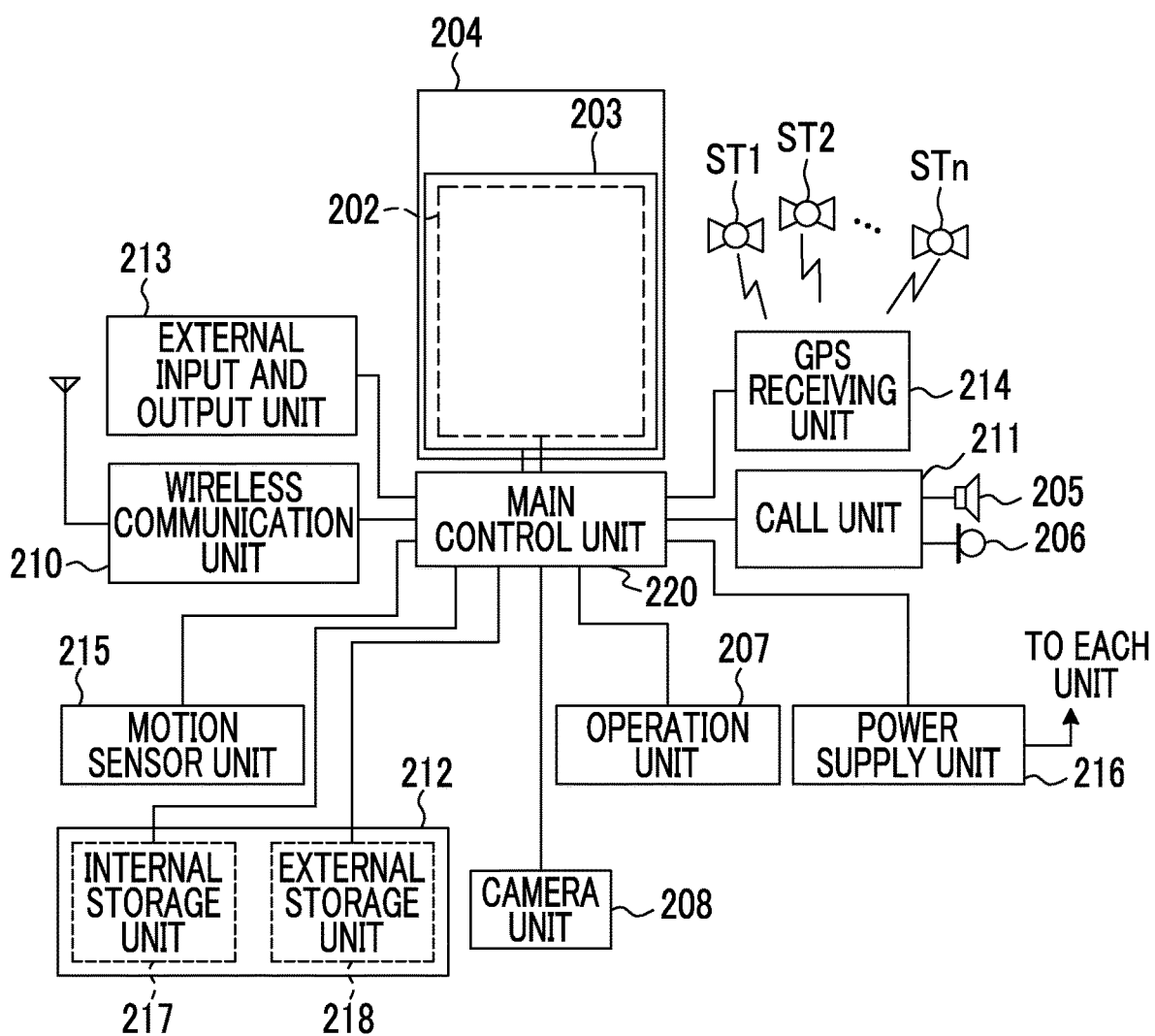
FIG. 11 is a block diagram showing a configuration of the smartphone 200 shown in FIG. 10.

FIG. 11 is a block diagram showing a configuration of the smartphone 200 shown in FIG. 10.

As shown in FIG. 11, a wireless communication unit 210, a display input unit 204, a call unit 211, an operation unit 207, a camera unit 208, a storage unit 212, an external input and output unit 213, a global positioning system (GPS) receiving unit 214, a motion sensor unit 215, a power supply unit 216, and a main control unit 220 are provided as main elements of the smartphone.

Further, a wireless communication function for performing mobile wireless communication with a base station device BS (not shown) through a mobile communication network NW (not shown) is provided as a main function of the smartphone 200.

The wireless communication unit 210 performs wireless communication with the base station device BS accommodated in the mobile communication network NW in response to a command from the main control unit 220. This wireless communication is used to transmit and receive various pieces of file data such as voice data and image data, e-mail data, and the like, and receive Web data, streaming data, or the like.

The display input unit 204 is a so-called touch panel in which an image (static image and video image), character information, or the like is displayed to visually transmit information to the user and a user operation on the displayed information is detected under control of the main control unit 220, and comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on a display surface of the display panel 202 is visually recognizable and that detects one or a plurality of coordinates operated by a finger of the user or a stylus. In a case where such the device is operated by the finger of the user or the stylus, a detection signal generated due to the operation is output to the main control unit 220. Next, the main control unit 220 detects an operation position (coordinates) on the display panel 202 based on the received detection signal.

As shown in FIG. 11, although the display panel 202 and the operation panel 203 of the smartphone 200 exemplified as an embodiment of the imaging device according to the present invention integrally constitute the display input unit 204, the operation panel 203 is disposed so as to completely cover the display panel 202.

In a case where such a disposition is employed, the operation panel 203 may comprise a function of detecting the user operation even in a region outside the display panel 202. In other words, the operation panel 203 may comprise a detection region (hereinafter referred to as display region) for an overlapping portion that overlaps the display panel 202 and a detection region (hereinafter referred to as non-display region) for an outer edge portion, which is other than the detection region, that does not overlap the display panel 202.

A size of the display region and a size of the display panel 202 may be perfectly matched, but the sizes are not necessarily matched. The operation panel 203 may comprise two sensitive regions of the outer edge portion and the other inner portion. Further, a width of the outer edge portion is designed as appropriate according to a size of the housing 201 or the like.

Furthermore, examples of a position detection method employed in the operation panel 203 include a matrix switch method, a resistive film method, a surface acoustic wave method, an infrared method, an electromagnetic induction method, and an electrostatic capacitive method, and any method may be employed.

The call unit 211 comprises the speaker 205 and the microphone 206. The call unit 211 converts a voice of the user input through the microphone 206 into voice data that can be processed by the main control unit 220 and outputs the converted voice data to the main control unit 220, or decodes the voice data received by the wireless communication unit 210 or the external input and output unit 213 and outputs the decoded voice data from the speaker 205.

As shown in FIG. 10, it is possible to mount the speaker 205 on the same surface as a surface on which the display input unit 204 is provided, and to mount the microphone 206 on a side surface of the housing 201, for example.

The operation unit 207 is a hardware key using a key switch or the like and receives the command from the user.

For example, as shown in FIG. 10, the operation unit 207 is a push-button type switch that is mounted on a side surface of the housing 201 of the smartphone 200, is turned on in a case of being pressed with a finger or the like, and is turned off by restoring force of a spring or the like in a case where the finger is released.

The storage unit 212 stores a control program or control data of the main control unit 220, application software, address data in which a name, a telephone number, or the like of a communication partner is associated, data of transmitted and received e-mails, Web data downloaded by Web browsing, or downloaded content data, and temporarily stores streaming data or the like. The storage unit 212 is composed of an internal storage unit 217 built into the smartphone and an external storage unit 218 having an attachable and detachable external memory slot.

Each of the internal storage unit 217 and the external storage unit 218 constituting the storage unit 212 is formed by using a storage medium such as a flash memory type, a hard disk type, a multimedia card micro type, a card type memory (for example, MicroSD (registered trademark) memory or the like), a random access memory (RAM), or a read only memory (ROM).

The external input and output unit 213 serves as an interface with all external devices connected to the smartphone 200, and is for directly or indirectly connecting to other external devices by communication or the like (for example, universal serial bus (USB), IEEE1394, or the like) or a network (for example, Internet, wireless LAN, Bluetooth (registered trademark), radio frequency identification (RFID), infrared communication (Infrared Data Association: IrDA) (registered trademark), Ultra Wideband (UWB) (registered trademark), or ZigBee (registered trademark).

Examples of the external devices connected to the smartphone 200 include a wire/wireless headset, a wire/wireless external charger, a wire/wireless data port, a memory card connected through a card socket, a subscriber identity module card (SIM)/user identity module card (UIM) card, an external audio/video device connected through audio/video input/output (I/O) terminal, an external audio/video device wirelessly connected, a wire/wirelessly connected smartphone, a wire/wirelessly connected personal computer, and an earphone.

The external input and output unit 213 can transmit the data transmitted from such an external device to each component inside the smartphone 200 or can transmit the data inside the smartphone 200 to the external device.

The GPS receiving unit 214 receives GPS signals transmitted from GPS satellites ST1 to STn in response to the command from the main control unit 220 and executes positioning calculation processing based on the plurality of received GPS signals to detect a position, which is composed of latitude, longitude, and altitude, of the smartphone 200. In a case where position information can be acquired from the wireless communication unit 210 or the external input and output unit 213 (for example, wireless LAN), the GPS receiving unit 214 can detect the position thereof using the position information.

The motion sensor unit 215 comprises, for example, a triaxial acceleration sensor and detects a physical movement of the smartphone 200 in response to the command from the main control unit 220. With the detection of the physical movement of the smartphone 200, a moving direction or acceleration of the smartphone 200 is detected. Such a detection result is output to the main control unit 220.

The power supply unit 216 supplies electric power accumulated in a battery (not shown) to each unit of the smartphone 200 in response to the command from the main control unit 220.

The main control unit 220 comprises a microprocessor and operates according to the control program or the control data stored in the storage unit 212 to integrally control each unit of the smartphone 200. The main control unit 220 has a mobile communication control function for controlling each unit of a communication system and an application processing function to perform voice communication or data communication through the wireless communication unit 210.

The application processing function is realized by the main control unit 220 operating according to the application software stored in the storage unit 212. Examples of the application processing function include an infrared communication function that controls the external input and output unit 213 to perform the data communication with a counterpart device, an e-mail function that transmits and receives e-mails, and a Web browsing function that browses a Web page.

The main control unit 220 also has an image processing function such as displaying a video on the display input unit 204 based on the image data (data of static image or video image) such as received data or downloaded streaming data.

The image processing function means a function of the main control unit 220 decoding the image data described above, performing the image processing on the decoding result, and displaying the image on the display input unit 204.

Further, the main control unit 220 executes display control for the display panel 202 and operation detection control for detecting the user operation through the operation unit 207 and the operation panel 203.

With the execution of the display control, the main control unit 220 displays an icon for activating the application software, a software key such as a scroll bar, or a window for creating an e-mail.

The scroll bar is a software key for receiving a command to move a display portion of an image, such as a large image that does not fit in the display region of the display panel 202.

With the execution of the operation detection control, the main control unit 220 detects the user operation through the operation unit 207, receives an operation for an icon or an input of a character string in an input field of a window through the operation panel 203, or receives a request for scrolling the display image through the scroll bar.

Further, with the execution of the operation detection control, the main control unit 220 determines whether the operation position for the operation panel 203 is the overlapping portion (display region) that overlaps the display panel 202 or the other outer edge portion (non-display region) that does not overlap the display panel 202, and has a touch panel control function for controlling the sensitive region of the operation panel 203 or a display position of the software key.

The main control unit 220 can also detect a gesture operation for the operation panel 203 and execute a function set in advance according to the detected gesture operation.

The gesture operation does not mean a simple touch operation in the related art, but means an operation of drawing a trajectory with a finger or the like, designating a plurality of positions at the same time, or combining these to draw the trajectory for at least one from the plurality of positions.

The camera unit 208 includes configurations other than the external memory control unit 20, the storage medium 21, the display control unit 22, the display unit 23, and the operation unit 14 in the digital camera shown in FIG. 1.

The captured image data generated by the camera unit 208 can be stored in the storage unit 212 or output through the external input and output unit 213 or the wireless communication unit 210.

In the smartphone 200 shown in FIG. 10, the camera unit 208 is mounted on the same surface as the display input unit 204, but the mounting position of the camera unit 208 is not limited thereto, and may be mounted on a back surface of the display input unit 204.

The camera unit 208 can be used for various functions of the smartphone 200. For example, it is possible to display the image acquired by the camera unit 208 on the display panel 202 or use the image of the camera unit 208 as one of operation inputs of the operation panel 203.

In a case where the GPS receiving unit 214 detects the position, it is possible to detect the position with reference to the image from the camera unit 208. Further, it is possible to determine an optical axis direction of the camera unit 208 of the smartphone 200 or a current use environment without using the triaxial acceleration sensor or in combination with the triaxial acceleration sensor with reference to the image from the camera unit 208. Of course, it is possible to use the image from the camera unit 208 in the application software.

The image data of the static image or the video can be stored in the storage unit 212 or be output through the external input and output unit 213 or the wireless communication unit 210, by being adding the position information acquired by the GPS receiving unit 214, voice information acquired by the microphone 206 (voice information may be converted into text information by voice-text conversion by the main control unit or the like), posture information acquired by the motion sensor unit 215, and the like.

Also in the smartphone 200 having the above configuration, it is possible to detect the leakage light with high accuracy.

In the above description, the imaging element 5 has the pixels 51 that detect three colors. However, an embodiment of the present invention can be employed as long as the imaging element 5 has a configuration in which the pixels 51 that detect four or more colors are arranged with a pattern in which the different color pixels are always arranged at the top, bottom, left, and right.

As described above, the following items are disclosed in the present specification.

(1)

A leakage light detection device that detects leakage light to a pixel to be detected from a pixel other than the pixel to be detected, based on a signal output from an imaging element having a light-receiving surface in which at least three types of pixels that detect different colors are arranged two-dimensionally in a first direction and a second direction orthogonal to the first direction, in which the pixels are arranged on the light-receiving surface according to a pattern in which pixels having a type different from the pixels are arranged adjacent to the first direction and the second direction of the pixels, a part of the pixels that detect a first color is replaced with a specific pixel that detects the same second color as the pixel, which is arranged at a position adjacent to the first direction or the second direction of the pixel, a pixel group including the specific pixel and a plurality of the pixels that detect the second color adjacent to the specific pixel is set as a first pixel group, any one of the pixels in the first pixel group excluding the specific pixel is the pixel to be detected, at least one of the pixels in the first pixel group excluding the specific pixel and the pixel to be detected is set as a pixel for determination, and the leakage light detection device comprises a determination unit that acquires a first pixel value of the pixel to be detected and a second pixel value of the pixel for determination and determines the presence or absence of the leakage light to the pixel to be detected based on the first pixel value and the second pixel value.

(2)

The leakage light detection device according to (1), in which the determination unit determines the presence or absence of the leakage light to the pixel to be detected based on a first comparison result of the first pixel value and the second pixel value.

(3)

The leakage light detection device according to (1) or (2), in which the pixel for determination is a pixel in which a pixel that detects a color other than the second color is arranged adjacent to a direction from the pixel to be detected toward a pixel having the same color as the pixel to be detected and located adjacent to the pixel to be detected.

(4)

The leakage light detection device according to any one of (1) to (3), in which the specific pixel is arranged in a state where the pixel that detects the second color is arranged adjacent to each of the first direction and the second direction, and the first pixel group includes a total of five pixels including the specific pixel and the pixels adjacent to the specific pixel in each of the first direction and the second direction.

(5)

The leakage light detection device according to (4), in which the first pixel group includes two specific pixels arranged in the first direction, and the determination unit performs the determination by using, among a first pixel arranged between the specific pixels, a second pixel adjacent to one of the specific pixels in the second direction, and a third pixel adjacent to the other of the specific pixels in the second direction, each of the first pixel and at least one of the second pixel or the third pixel as the pixel to be detected.

(6)

The leakage light detection device according to (5), in which each of the specific pixel and a pixel adjacent to the specific pixel on an opposite side of the first pixel is a pixel for phase difference detection.

(7)

The leakage light detection device according to (6), in which the determination unit determines, in a case where determination is performed with the first pixel as the pixel to be detected, a direction of the leakage light by further using a comparison result of pixel values of pixels having the same light receiving characteristic among the pixels for phase difference detection included in the first pixel group.

(8)

The leakage light detection device according to (7), in which the pixels for phase difference detection included in the first pixel group are composed of a first pair of a first pixel for phase difference detection having a first light receiving characteristic and a second pixel for phase difference detection having a second light receiving characteristic different from the first light receiving characteristic and a second pair of a third pixel for phase difference detection having the first light receiving characteristic and a fourth pixel for phase difference detection having the second light receiving characteristic, the pixel that detects a color different from that of the first pixel for phase difference detection is arranged adjacent to the first pixel for phase difference detection on one side of the first direction, the pixel that detects a color different from that of the fourth pixel for phase difference detection is arranged adjacent to the fourth pixel for phase difference detection on the other side of the first direction, and the determination unit determines, in a case where determination is performed with the first pixel as the pixel to be detected, the presence or absence and a direction of the leakage light based on a first comparison result of the first pixel value and the second pixel value with at least one of the second pixel or the third pixel as the pixel for determination, a second comparison result of a pixel value of the first pixel for phase difference detection and a pixel value of the third pixel for phase difference detection, and a third comparison result of a pixel value of the second pixel for phase difference detection and a pixel value of the fourth pixel for phase difference detection.

(9)

The leakage light detection device according to (8), in which the determination unit determines, in a case where the determination is made with the first pixel as the pixel to be detected, that the leakage light from the pixel adjacent to the pixel to be detected in the first direction is present in a case where the first comparison result that the first pixel value is larger than the second pixel values of all the pixels for determination by a threshold value or more is obtained.

(10)

The leakage light detection device according to (9), in which the determination unit determines, in a case where the first comparison result that the first pixel value is larger than the second pixel values of all the pixels for determination by a threshold value or more is obtained and the second comparison result that a pixel value of the third pixel for phase difference detection is larger than a pixel value of the first pixel for phase difference detection by a threshold value or more is obtained, that the leakage light from the pixel adjacent to the pixel to be detected on one side of the first direction is present, and further determines, in a case where the first comparison result that the first pixel value is larger than the second pixel values of all the pixels for determination by a threshold value or more is obtained and the third comparison result that a pixel value of the second pixel for phase difference detection is larger than a pixel value of the fourth pixel for phase difference detection by a threshold value or more is obtained, that the leakage light from the pixel adjacent to the pixel to be detected on the other side of the first direction is present.

(11)

The leakage light detection device according to any one of (1) to (5), in which the specific pixel is a pixel for phase difference detection.

(12)

The leakage light detection device according to (11), in which a part of the pixels for determination is a pixel for phase difference detection.

(13)

The leakage light detection device according to any one of (1) to (6), in which the determination unit determines, in a case where at least a first comparison result that the first pixel value is larger than the second pixel values of all the pixels for determination by a threshold value or more is obtained, that the leakage light is present.

(14)

The leakage light detection device according to (13), in which pixels other than the first pixel group among the pixels arranged on the light-receiving surface are defined as a second pixel group, and the determination unit further acquires a third pixel value of the pixel of the second pixel group that detects the same color as the pixel to be detected and is close to the pixel to be detected and determines, in a case where the first comparison result that the first pixel value is larger than the second pixel values of all the pixels for determination by a threshold value or more is obtained and a fourth comparison result that the first pixel value is larger than all the third pixel values by a threshold value or more is obtained, that the leakage light is present.

(15)

The leakage light detection device according to any one of (1) to (14), in which the specific pixel is arranged in a state where the pixel that detects the second color is arranged adjacent to each of the first direction and the second direction, the first pixel group includes a total of five pixels including the specific pixel and the pixels adjacent to the specific pixel in each of the first direction and the second direction, and the determination unit performs the determination by using each of at least three pixels adjacent to the specific pixel in the first pixel group as the pixel to be detected and distinguishes a traveling direction of the leakage light to the pixel to be detected in the first pixel group into three directions or four directions.

(16)

The leakage light detection device according to any one of (1) to (15), in which a plurality of the first pixel groups are periodically and discretely arranged on the light-receiving surface, and the determination unit performs the determination for each of the first pixel groups.

(17)

The leakage light detection device according to (16), further comprising:

a correction unit that corrects, in a case where N or more first pixel groups including the pixel to be detected determined by the determination unit to have the leakage light among the first pixel groups are locally present with N as a natural number of two or more, the pixel to be detected of the N first pixel groups.

(18)

The leakage light detection device according to (17), in which the correction unit performs the correction in a case where N or more first pixel groups including the pixel to be detected determined by the determination unit to have the leakage light are continuously arranged in the first direction or the second direction.

(19)

The leakage light detection device according to any one of (1) to (18), in which the imaging element includes the pixel that detects red through a red filter, the pixel that detects green through a green filter, and the pixel that detects blue through a blue filter, and the pattern is a pattern in which the red filter, the green filter, and the blue filter are arranged in a Bayer pattern.

(20)

The leakage light detection device according to (19), in which the first color is red or blue, and the specific pixel is a pixel that detects green through the green filter.

(21)

An imaging device comprising:

the leakage light detection device according to any one of (1) to (20); and the imaging element.

(22)

A leakage light detection method in which leakage light to a pixel to be detected from a pixel other than the pixel to be detected is detected based on a signal output from an imaging element having a light-receiving surface in which at least three types of pixels that detect different colors are arranged two-dimensionally in a first direction and a second direction orthogonal to the first direction, in which the pixels are arranged on the light-receiving surface according to a pattern in which pixels having a type different from the pixels are arranged adjacent to the first direction and the second direction of the pixels, a part of the pixels that detect a first color is replaced with a specific pixel that detects the same second color as the pixel, which is arranged at a position adjacent to the first direction or the second direction of the pixel, a pixel group including the specific pixel and a plurality of the pixels that detect the second color adjacent to the specific pixel is set as a first pixel group, any one of the pixels in the first pixel group excluding the specific pixel is the pixel to be detected, at least one of the pixels in the first pixel group excluding the specific pixel and the pixel to be detected is set as a pixel for determination, and the leakage light detection method comprises a determination step of acquiring a first pixel value of the pixel to be detected and a second pixel value of the pixel for determination and determining the presence or absence of the leakage light to the pixel to be detected based on the first pixel value and the second pixel value.

(23)

The leakage light detection method according to (22), in which in the determination step, the presence or absence of the leakage light to the pixel to be detected is determined based on a first comparison result of the first pixel value and the second pixel value.

(24)

The leakage light detection method according to (22) or (23), in which the pixel for determination is a pixel in which a pixel that detects a color other than the second color is arranged adjacent to a direction from the pixel to be detected toward a pixel having the same color as the pixel to be detected and located adjacent to the pixel to be detected.

(25)

The leakage light detection method according to any one of (22) to (24), in which the specific pixel is arranged in a state where the pixel that detects the second color is arranged adjacent to each of the first direction and the second direction, the first pixel group includes a total of five pixels including the specific pixel and the pixels adjacent to the specific pixel in each of the first direction and the second direction.

(26)

The leakage light detection method according to (25), in which the first pixel group includes two specific pixels arranged in the first direction, and in the determination step, the determination is performed by using, among a first pixel arranged between the specific pixels, a second pixel adjacent to one of the specific pixels in the second direction, and a third pixel adjacent to the other of the specific pixels in the second direction, each of the first pixel and at least one of the second pixel or the third pixel as the pixel to be detected.

(27)

The leakage light detection method according to (26), in which each of the specific pixel and a pixel adjacent to the specific pixel on an opposite side of the first pixel is a pixel for phase difference detection.

(28)

The leakage light detection method according to (27), in which in the determination step, in a case where determination is performed with the first pixel as the pixel to be detected, a direction of the leakage light is determined by further using a comparison result of pixel values of pixels having the same light receiving characteristic among the pixels for phase difference detection included in the first pixel group.

(29)

The leakage light detection method according to (28), in which the pixels for phase difference detection included in the first pixel group are composed of a first pair of a first pixel for phase difference detection having a first light receiving characteristic and a second pixel for phase difference detection having a second light receiving characteristic different from the first light receiving characteristic and a second pair of a third pixel for phase difference detection having the first light receiving characteristic and a fourth pixel for phase difference detection having the second light receiving characteristic, the pixel that detects a color different from that of the first pixel for phase difference detection is arranged adjacent to the first pixel for phase difference detection on one side of the first direction, the pixel that detects a color different from that of the fourth pixel for phase difference detection is arranged adjacent to the fourth pixel for phase difference detection on the other side of the first direction, and in the determination step, in a case where determination is performed with the first pixel as the pixel to be detected, the presence or absence and a direction of the leakage light are determined based on a first comparison result of the first pixel value and the second pixel value with at least one of the second pixel or the third pixel as the pixel for determination, a second comparison result of a pixel value of the first pixel for phase difference detection and a pixel value of the third pixel for phase difference detection, and a third comparison result of a pixel value of the second pixel for phase difference detection and a pixel value of the fourth pixel for phase difference detection.

(30)

The leakage light detection method according to (29), in which in the determination step, determination is made, in a case where the determination is made with the first pixel as the pixel to be detected, that the leakage light from the pixel adjacent to the pixel to be detected in the first direction is present in a case where the first comparison result that the first pixel value is larger than the second pixel values of all the pixels for determination by a threshold value or more is obtained.

(31)

The leakage light detection method according to (30), in which in the determination step, determination is made, in a case where the first comparison result that the first pixel value is larger than the second pixel values of all the pixels for determination by a threshold value or more is obtained and the second comparison result that a pixel value of the third pixel for phase difference detection is larger than a pixel value of the first pixel for phase difference detection by a threshold value or more is obtained, that the leakage light from the pixel adjacent to the pixel to be detected on one side of the first direction is present, and further determination is made, in a case where the first comparison result that the first pixel value is larger than the second pixel values of all the pixels for determination by a threshold value or more is obtained and the third comparison result that a pixel value of the second pixel for phase difference detection is larger than a pixel value of the fourth pixel for phase difference detection by a threshold value or more is obtained, that the leakage light from the pixel adjacent to the pixel to be detected on the other side of the first direction is present.

(32)

The leakage light detection method according to any one of (22) to (26), in which the specific pixel is a pixel for phase difference detection.

(33)

The leakage light detection method according to (32), in which a part of the pixels for determination is a pixel for phase difference detection.

(34)

The leakage light detection method according to any one of (22) to (27), in which in the determination step, determination is made, in a case where at least a first comparison result that the first pixel value is larger than the second pixel values of all the pixels for determination by a threshold value or more is obtained, that the leakage light is present.

(35)

The leakage light detection method according to (24), in which pixels other than the first pixel group among the pixels arranged on the light-receiving surface are defined as a second pixel group, and in the determination step, a third pixel value of the pixel of the second pixel group that detects the same color as the pixel to be detected and is close to the pixel to be detected is further acquired and determination is made, in a case where the first comparison result that the first pixel value is larger than the second pixel values of all the pixels for determination by a threshold value or more is obtained and a fourth comparison result that the first pixel value is larger than all the third pixel values by a threshold value or more is obtained, that the leakage light is present.

(36)

The leakage light detection method according to any one of (22) to (35), in which the specific pixel is arranged in a state where the pixel that detects the second color is arranged adjacent to each of the first direction and the second direction, the first pixel group includes a total of five pixels including the specific pixel and the pixels adjacent to the specific pixel in each of the first direction and the second direction, and in the determination step, the determination is performed by using each of at least three pixels adjacent to the specific pixel in the first pixel group as the pixel to be detected and a traveling direction of the leakage light to the pixel to be detected in the first pixel group is distinguished into three directions or four directions.

(37)

The leakage light detection method according to any one of (22) to (36), in which a plurality of the first pixel groups are periodically and discretely arranged on the light-receiving surface, and in the determination step, the determination is performed for each of the first pixel groups.

(38)

The leakage light detection method according to (37), further comprising:

a correction step of correcting, in a case where N or more first pixel groups including the pixel to be detected determined in the determination step to have the leakage light among the first pixel groups are locally present with N as a natural number of two or more, the pixel to be detected of the N first pixel groups.

(39)

The leakage light detection method according to (38), in which in the correction step, the correction is performed in a case where N or more first pixel groups including the pixel to be detected determined in the determination step to have the leakage light are continuously arranged in the first direction or the second direction.

(40)

The leakage light detection method according to any one of (22) to (39), in which the imaging element includes the pixel that detects red through a red filter, the pixel that detects green through a green filter, and the pixel that detects blue through a blue filter, and the pattern is a pattern in which the red filter, the green filter, and the blue filter are arranged in a Bayer pattern.

(41)

The leakage light detection method according to (40), in which the first color is red or blue, and the specific pixel is a pixel that detects green through the green filter.

(42)

A non-transitory computer readable recording medium storing a leakage light detection program for detecting leakage light to a pixel to be detected from a pixel other than the pixel to be detected based on a signal output from an imaging element having a light-receiving surface in which at least three types of pixels that detect different colors are arranged two-dimensionally in a first direction and a second direction orthogonal to the first direction, in which the pixels are arranged on the light-receiving surface according to a pattern in which pixels having a type different from the pixels are arranged adjacent to the first direction and the second direction of the pixels, the specific pixel, which is a part of the pixels that detect a first color on the light-receiving surface, is replaced with a pixel that detects the same second color as the pixel, which is arranged at a position adjacent to the first direction or the second direction of the pixel, a pixel group including the specific pixel and a plurality of the pixels that detect the second color adjacent to the specific pixel is set as a first pixel group, any one of the pixels in the first pixel group excluding the specific pixel is the pixel to be detected, at least one of the pixels in the first pixel group excluding the specific pixel and the pixel to be detected is set as a pixel for determination, and the leakage light detection program causing a computer to execute a determination step of acquiring a first pixel value of the pixel to be detected and a second pixel value of the pixel for determination and determining the presence or absence of the leakage light to the pixel to be detected based on the first pixel value and the second pixel value.

EXPLANATION OF REFERENCES

1: imaging lens
2: stop
4: lens control unit
5: imaging element
8: lens drive unit
9: stop drive unit
10: image sensor drive unit
11: system control unit
11A: determination unit
11B: correction unit
14: operation unit
15: memory control unit
16: main memory
17: digital signal processing unit
20: external memory control unit
21: storage medium
22: display control unit
23: display unit
24: control bus
25: data bus
40: lens device
50: light-receiving surface
53: AF area
51r: R pixel
51g: G pixel
51b: B pixel
GR1: first pixel group
p: pair
H: range
H1: high-brightness subject
200: smartphone
201: housing
202: display panel
203: operation panel
204: display input unit
205: speaker
206: microphone
207: operation unit
208: camera unit
210: wireless communication unit
211: call unit
212: storage unit
213: external input and output unit
214: GPS receiving unit
215: motion sensor unit
216: power supply unit
217: internal storage unit
218: external storage unit
220: main control unit
ST1 to STn: GPS satellite

What is claimed is:

1. A leakage light detection device comprising:
an imaging element having a light-receiving surface in which at least three types of pixels that detect different colors including a first color and a second color are arranged two-dimensionally along a first direction and a second direction orthogonal to the first direction; and a processor that is configured to determine presence or absence of leakage light to a pixel to be detected from a pixel other than the pixel to be detected using a pixel value acquired from the imaging element, wherein the light-receiving surface includes a first pixel group that consists of a pixel group that detects the second color and includes a specific pixel, one or more pixels adjacent to the specific pixel in the first direction, and one or more pixels adjacent to the specific pixel in the second direction, the processor determines any pixel of the first pixel group excluding the specific pixel as the pixel to be detected, determines at least one pixel of the first pixel group excluding the specific pixel and the pixel to be detected as a pixel for determination, and determines the presence or absence of the leakage light of a direction toward the pixel to be detected from the specific pixel based on a first pixel value which is a pixel value of the pixel to be detected and a second pixel value which is a pixel value of the pixel for determination, the first pixel group includes a total of five pixels including the specific pixel and pixels adjacent to the specific pixel in each of the first direction and the second direction, the first pixel group includes two specific pixels arranged in the first direction, and the processor determines the presence or absence of the leakage light of each direction toward each pixel to be detected from the specific pixel, among a first pixel arranged between the specific pixels, a second pixel adjacent to one of the specific pixels in the second direction, and a third pixel adjacent to the other of the specific pixels in the second direction, in each of a plurality of pixels to be detected including the first pixel and at least one of the second pixel and the third pixel.

2. The leakage light detection device according to claim 1, wherein the processor determines a plurality of pixels to be detected among the first pixel group excluding the specific pixel and determines the presence or absence of the leakage light of each direction toward each pixel to be detected from the specific pixel, in each of the plurality of pixels to be detected.

3. The leakage light detection device according to claim 1, wherein the pixel for determination is a pixel in which a pixel that detects a color other than the second color is arranged adjacent to a direction from the pixel to be detected toward a pixel having the same color as the pixel to be detected and located adjacent to the pixel to be detected.

4. The leakage light detection device according to claim 1, wherein each of the specific pixel and a pixel adjacent to the specific pixel on an opposite side of the first pixel is a pixel for phase difference detection.

5. The leakage light detection device according to claim 4, wherein the processor determines, in a case where the presence or absence of the leakage light is determined by using the first pixel as the pixel to be detected, a direction of the leakage light by further using a comparison result of pixel values of pixels having the same light receiving characteristic among the pixels for phase difference detection included in the first pixel group.

6. The leakage light detection device according to claim 5, wherein the pixels for phase difference detection included in the first pixel group are composed of a first pair of a first pixel for phase difference detection having a first light receiving characteristic and a second pixel for phase difference detection having a second light receiving characteristic different from the first light receiving characteristic and a second pair of a third pixel for phase difference detection having the first light receiving characteristic and a fourth pixel for phase difference detection having the second light receiving characteristic, the pixel that detects a color different from that of the first pixel for phase difference detection is arranged adjacent to the first pixel for phase difference detection on one side of the first direction, the pixel that detects a color different from that of the fourth pixel for phase difference detection is arranged adjacent to the fourth pixel for phase difference detection on the other side of the first direction, and the processor determines, in a case where the presence or absence of the leakage light is determined by using the first pixel as the pixel to be detected, the presence or absence and a direction of the leakage light based on a first comparison result of the first pixel value and the second pixel value with at least one of the second pixel and the third pixel as the pixel for determination, a second comparison result of a pixel value of the first pixel for phase difference detection and a pixel value of the third pixel for phase difference detection, and a third comparison result of a pixel value of the second pixel for phase difference detection and a pixel value of the fourth pixel for phase difference detection.

7. The leakage light detection device according to claim 6, wherein the processor determines, in a case where the determination is made with the first pixel as the pixel to be detected, that the leakage light from the pixel adjacent to the pixel to be detected in the first direction is present in a case where the first comparison result that the first pixel value is larger than the second pixel values of all the pixels for determination by a threshold value or more is obtained.

8. The leakage light detection device according to claim 7, wherein the processor determines, in a case where the first comparison result that the first pixel value is larger than the second pixel values of all the pixels for determination by the threshold value or more is obtained and the second comparison result that a pixel value of the third pixel for phase difference detection is larger than a pixel value of the first pixel for phase difference detection by the threshold value or more is obtained, that the leakage light from the pixel adjacent to the pixel to be detected on one side of the first direction is present, and further determines, in a case where the first comparison result that the first pixel value is larger than the second pixel values of all the pixels for determination by the threshold value or more is obtained and the third comparison result that a pixel value of the second pixel for phase difference detection is larger than a pixel value of the fourth pixel for phase difference detection by the threshold value or more is obtained, that the leakage light from the pixel adjacent to the pixel to be detected on the other side of the first direction is present.

9. The leakage light detection device according to claim 1,
wherein the specific pixel is a pixel for phase difference detection.

10. The leakage light detection device according to claim 9,
wherein a part of the pixels for determination is a pixel for phase difference detection.

11. The leakage light detection device according to claim 1,
wherein the processor determines, in a case where at least a first comparison result that the first pixel value is larger than the second pixel values of all the pixels for determination by a threshold value or more is obtained, that the leakage light of a direction toward the pixel to be detected from the specific pixel is present.

12. The leakage light detection device according to claim 11,
wherein pixels other than the first pixel group among the pixels arranged on the light-receiving surface are defined as a second pixel group, and
the processor further acquires a third pixel value of the pixel of the second pixel group that detects the same color as the pixel to be detected and is close to the pixel to be detected and determines, in a case where the first comparison result that the first pixel value is larger than the second pixel values of all the pixels for determination by the threshold value or more is obtained and a fourth comparison result that the first pixel value is larger than all the third pixel values by the threshold value or more is obtained, that the leakage light of a direction toward the pixel to be detected from the specific pixel is present.

13. The leakage light detection device according to claim 1,
wherein the specific pixel is arranged in a state where the pixel that detects the second color is arranged adjacent to each of the first direction and the second direction,
the first pixel group includes a total of five pixels including the specific pixel and the pixels adjacent to the specific pixel in each of the first direction and the second direction, and
the processor determines the presence or absence of the leakage light by using each of at least three pixels adjacent to the specific pixel in the first pixel group as the pixel to be detected and distinguishes a traveling direction of the leakage light to the pixel to be detected in the first pixel group into three directions or four directions.

14. The leakage light detection device according to claim 1,
wherein a plurality of the first pixel groups are periodically and discretely arranged on the light-receiving surface, and
the processor determines the presence or absence of the leakage light of a direction toward the pixel to be detected from the specific pixel for each of the first pixel groups.

15. The leakage light detection device according to claim 14,
the processor is further to configured to correct, in a case where N or more first pixel groups including the pixel to be detected determined to have the leakage light among the first pixel groups are locally present with N as a natural number of two or more, the pixel to be detected of the N first pixel groups.

16. The leakage light detection device according to claim 15,
wherein the processor performs the correction in a case where N or more first pixel groups including the pixel to be detected determined to have the leakage light are continuously arranged in the first direction or the second direction.

17. The leakage light detection device according to claim 1,
wherein the pixels arranged on the light-receiving surface include a pixel that detects red through a red filter, a pixel that detects green through a green filter, and a pixel that detects blue through a blue filter, and
the red filter, the green filter, and the blue filter are arranged on the light-receiving surface in a Bayer pattern.

18. The leakage light detection device according to claim 17,
wherein the first color is red or blue, and
the specific pixel is a pixel that detects green through the green filter.

19. An imaging device comprising:
the leakage light detection device according to claim 1; and
the imaging element.

20. A leakage light detection method of determining presence or absence of leakage light to a pixel to be detected from a pixel other than the pixel to be detected by using a pixel value acquired from an imaging element having a light-receiving surface in which at least three types of pixels that detect different colors including a first color and a second color are arranged two-dimensionally along a first direction and a second direction orthogonal to the first direction, the method comprising:
determining any pixel of a first pixel group arranged on the light-receiving surface, excluding a specific pixel, as the pixel to be detected, the first pixel group consisting of a pixel group that detects the second color and including the specific pixel, one or more pixels adjacent to the specific pixel in the first direction, and one or more pixels adjacent to the specific pixel in the second direction;
determining at least one pixel of the first pixel group excluding the specific pixel and the pixel to be detected as a pixel for determination; and
determining the presence or absence of the leakage light of a direction toward the pixel to be detected from the specific pixel based on a first pixel value of the pixel to be detected and a second pixel value of the pixel for determination,
wherein the first pixel group includes a total of five pixels including the specific pixel and pixels adjacent to the specific pixel in each of the first direction and the second direction,
the first pixel group includes two specific pixels arranged in the first direction, and
the presence or absence of the leakage light of each direction toward each pixel to be detected from the specific pixel is determined, among a first pixel arranged between the specific pixels, a second pixel adjacent to one of the specific pixels in the second direction, and a third pixel adjacent to the other of the specific pixels in the second direction, in each of a plurality of pixels to be detected including the first pixel and at least one of the second pixel and the third pixel.

21. The leakage light detection method according to claim 20,
wherein a plurality of pixels to be detected are determined among the first pixel group excluding the specific pixel and the presence or absence of the leakage light of each direction toward each pixel to be detected from the specific pixel is determined in each of the plurality of pixels to be detected.

22. The leakage light detection method according to claim 20,
wherein the pixel for determination is a pixel in which a pixel that detects a color other than the second color is arranged adjacent to a direction from the pixel to be detected toward a pixel having the same color as the pixel to be detected and located adjacent to the pixel to be detected.

23. The leakage light detection method according to claim 20,
wherein each of the specific pixel and a pixel adjacent to the specific pixel on an opposite side of the first pixel is a pixel for phase difference detection.

24. The leakage light detection method according to claim 23,
wherein in a case where the presence or absence of the leakage light is determined by using the first pixel as the pixel to be detected, a direction of the leakage light is determined by further using a comparison result of pixel values of pixels having the same light receiving characteristic among the pixels for phase difference detection included in the first pixel group.

25. The leakage light detection method according to claim 24,
wherein the pixels for phase difference detection included in the first pixel group are composed of a first pair of a first pixel for phase difference detection having a first light receiving characteristic and a second pixel for phase difference detection having a second light receiving characteristic different from the first light receiving characteristic and a second pair of a third pixel for phase difference detection having the first light receiving characteristic and a fourth pixel for phase difference detection having the second light receiving characteristic,
the pixel that detects a color different from that of the first pixel for phase difference detection is arranged adjacent to the first pixel for phase difference detection on one side of the first direction,
the pixel that detects a color different from that of the fourth pixel for phase difference detection is arranged adjacent to the fourth pixel for phase difference detection on the other side of the first direction, and
in a case where the presence or absence of the leakage light is determined by using the first pixel as the pixel to be detected, the presence or absence and a direction of the leakage light are determined based on a first comparison result of the first pixel value and the second pixel value with at least one of the second pixel and the third pixel as the pixel for determination, a second comparison result of a pixel value of the first pixel for phase difference detection and a pixel value of the third pixel for phase difference detection, and a third comparison result of a pixel value of the second pixel for phase difference detection and a pixel value of the fourth pixel for phase difference detection.

26. The leakage light detection method according to claim 25,
wherein determination is made, in a case where the presence or absence of the leakage light is determined by using the first pixel as the pixel to be detected, that the leakage light from the pixel adjacent to the pixel to be detected in the first direction is present in a case where the first comparison result that the first pixel value is larger than the second pixel values of all the pixels for determination by a threshold value or more is obtained.

27. The leakage light detection method according to claim 26,
wherein determination is made, in a case where the first comparison result that the first pixel value is larger than the second pixel values of all the pixels for determination by the threshold value or more is obtained and the second comparison result that a pixel value of the third pixel for phase difference detection is larger than a pixel value of the first pixel for phase difference detection by the threshold value or more is obtained, that the leakage light from the pixel adjacent to the pixel to be detected on one side of the first direction is present, and
determination is further made, in a case where the first comparison result that the first pixel value is larger than the second pixel values of all the pixels for determination by the threshold value or more is obtained and the third comparison result that a pixel value of the second pixel for phase difference detection is larger than a pixel value of the fourth pixel for phase difference detection by the threshold value or more is obtained, that the leakage light from the pixel adjacent to the pixel to be detected on the other side of the first direction is present.

28. The leakage light detection method according to claim 20,
wherein the specific pixel is a pixel for phase difference detection.

29. The leakage light detection method according to claim 28,
wherein a part of the pixels for determination is a pixel for phase difference detection.

30. The leakage light detection method according to claim 20,
wherein determination is made, in a case where at least a first comparison result that the first pixel value is larger than the second pixel values of all the pixels for determination by a threshold value or more is obtained, that the leakage light of a direction toward the pixel to be detected from the specific pixel is present.

31. The leakage light detection method according to claim 22,
wherein pixels other than the first pixel group among the pixels arranged on the light-receiving surface are defined as a second pixel group, and
a third pixel value of the pixel of the second pixel group that detects the same color as the pixel to be detected and is close to the pixel to be detected is further acquired and determination is made, in a case where a first comparison result that the first pixel value is larger than the second pixel values of all the pixels for determination by a threshold value or more is obtained and a fourth comparison result that the first pixel value is larger than all the third pixel values by the threshold value or more is obtained, that the leakage light of a direction toward the pixel to be detected from the specific pixel is present.

32. The leakage light detection method according to claim 20,
wherein the specific pixel is arranged in a state where the pixel that detects the second color is arranged adjacent to each of the first direction and the second direction,
the first pixel group includes a total of five pixels including the specific pixel and the pixels adjacent to the specific pixel in each of the first direction and the second direction, and
the presence or absence of the leakage light is determined by using each of at least three pixels adjacent to the specific pixel in the first pixel group as the pixel to be detected and a traveling direction of the leakage light to the pixel to be detected in the first pixel group is distinguished into three directions or four directions.

33. The leakage light detection method according to claim 20,
wherein a plurality of the first pixel groups are periodically and discretely arranged on the light-receiving surface, and
the presence or absence of the leakage light of a direction toward the pixel to be detected from the specific pixel is determined for each of the first pixel groups.

34. The leakage light detection method according to claim 33, further comprising:
correcting, in a case where N or more first pixel groups including the pixel to be detected determined to have the leakage light among the first pixel groups are locally present with N as a natural number of two or more, the pixel to be detected of the N first pixel groups.

35. The leakage light detection method according to claim 34,
wherein in the correction step, the correction is performed in a case where N or more first pixel groups including the pixel to be detected determined to have the leakage light are continuously arranged in the first direction or the second direction.

36. The leakage light detection method according to claim 20,
wherein the pixels arranged on the light-receiving surface include a pixel that detects red through a red filter, a pixel that detects green through a green filter, and a pixel that detects blue through a blue filter, and
the red filter, the green filter, and the blue filter are arranged on the light-receiving surface in a Bayer pattern.

37. The leakage light detection method according to claim 36,
wherein the first color is red or blue, and
the specific pixel is a pixel that detects green through the green filter.

38. A non-transitory computer readable recording medium storing a leakage light detection program for determining presence or absence of leakage light to a pixel to be detected from a pixel other than the pixel to be detected by using a pixel value acquired from an imaging element having a light-receiving surface in which at least three types of pixels that detect different colors including a first color and a second color are arranged two-dimensionally along a first direction and a second direction orthogonal to the first direction,
the leakage light detection program causing a computer to execute
determining any pixel of a first pixel group arranged on the light-receiving surface, excluding a specific pixel, as the pixel to be detected, the first pixel group consisting of a pixel group that detects the second color and including the specific pixel, one or more pixels adjacent to the specific pixel in the first direction, and one or more pixels adjacent to the specific pixel in the second direction,
determining at least one pixel of the first pixel group excluding the specific pixel and the pixel to be detected as a pixel for determination, and
determining the presence or absence of the leakage light of a direction toward the pixel to be detected from the specific pixel based on a first pixel value of the pixel to be detected and a second pixel value of the pixel for determination,
wherein the first pixel group includes a total of five pixels including the specific pixel and pixels adjacent to the specific pixel in each of the first direction and the second direction,
the first pixel group includes two specific pixels arranged in the first direction, and
the presence or absence of the leakage light of each direction toward each pixel to be detected from the specific pixel is determined, among a first pixel arranged between the specific pixels, a second pixel adjacent to one of the specific pixels in the second direction, and a third pixel adjacent to the other of the specific pixels in the second direction, in each of a plurality of pixels to be detected including the first pixel and at least one of the second pixel and the third pixel.

* * * * *